US008923861B2

(12) United States Patent
Cili et al.

(10) Patent No.: US 8,923,861 B2
(45) Date of Patent: Dec. 30, 2014

(54) FACILITATING RESELECTION BY A WIRELESS COMMUNICATION DEVICE TO A FIRST NETWORK FROM A SECOND NETWORK AFTER TERMINATION OF A CIRCUIT SWITCHED FALLBACK VOICE CALL

(71) Applicant: Apple Inc., Cupertino, CA (US)

(72) Inventors: Gencer Cili, Santa Clara, CA (US); Navid Damji, Cupertino, CA (US)

( * ) Notice: Subject to any disclaimer, the term of this patent is extended or adjusted under 35 U.S.C. 154(b) by 157 days.

(21) Appl. No.: 13/628,015

(22) Filed: Sep. 26, 2012

(65) Prior Publication Data

US 2014/0087723 A1 Mar. 27, 2014

(51) Int. Cl.
| | |
|---|---|
| *H04W 4/00* | (2009.01) |
| *H04W 36/00* | (2009.01) |
| *H04M 3/00* | (2006.01) |
| *H04M 11/04* | (2006.01) |
| *H04W 72/00* | (2009.01) |
| *H04J 1/02* | (2006.01) |
| *H04L 12/66* | (2006.01) |
| *H04L 12/26* | (2006.01) |

(52) U.S. Cl.
USPC ............... 455/435.2; 455/426.1; 455/432.1; 455/437; 455/418; 455/404.1; 455/422.1; 455/452.1; 455/452.2; 455/450; 455/440; 455/434; 455/435.3; 370/493; 370/331; 370/352; 370/328; 370/252; 370/332

(58) Field of Classification Search
CPC ..... H04W 24/10; H04W 24/08; H04W 48/16; H04W 24/02; H04L 5/00
USPC ............. 455/404.1, 418, 422.1, 426.1, 432.1, 455/434, 435.3, 437, 440, 450, 452; 370/221, 252, 328, 331, 332, 352, 493
See application file for complete search history.

(56) References Cited

U.S. PATENT DOCUMENTS

| | | | |
|---|---|---|---|
| 8,229,432 B2 | 7/2012 | Fox et al. | |
| 8,265,035 B2 | 9/2012 | Du et al. | |
| 8,532,233 B2 * | 9/2013 | Shimomura | 375/343 |
| 2012/0069731 A1 | 3/2012 | Tooher et al. | |
| 2012/0108252 A1 * | 5/2012 | Dimou et al. | 455/450 |
| 2012/0142328 A1 * | 6/2012 | Awoniyi et al. | 455/418 |

(Continued)

OTHER PUBLICATIONS

International Search Report and Written Opinion in PCT application PCT/US2013/059519, mailed Dec. 10, 2013.
"MAC Scheduling Scheme for VoIP Traffic Service in 3G LTE", Choi et al., IEEE, 2007, pp. 1441-1445.

(Continued)

*Primary Examiner* — Inder Mehra
(74) *Attorney, Agent, or Firm* — Womble Carlyle Sandridge & Rice, LLP

(57) ABSTRACT

A method for facilitating reselection by a wireless communication device to a first network from a second network after termination of a voice call for which a CSFB procedure was performed is provided. The method can include performing measurement of the first network while connected to the first network and performing measurement of the second network during the voice call. The method can further include determining based at least in part on one or more of the measurements that the wireless communication device is in a mobility state. The method can additionally include deriving a predicted signal quality of the first network after termination of the voice call based at least in part on the measurement of the first network and using the predicted signal quality to determine whether to release a connection to the second network and attempt reselection to the first network.

25 Claims, 17 Drawing Sheets

(56) References Cited

U.S. PATENT DOCUMENTS

| | | |
|---|---|---|
| 2012/0214483 A1 | 8/2012 | Tong et al. |
| 2013/0034080 A1* | 2/2013 | Yang et al. .................. 370/331 |
| 2013/0070728 A1* | 3/2013 | Umatt et al. ................. 370/331 |
| 2013/0176884 A1* | 7/2013 | Chang ......................... 370/252 |

OTHER PUBLICATIONS

"Channel Prediction-Based Adaptive Power Control for Dynamic Wireless Communications", Pham et al., IEEE, 2011, 6 pages.

Gessner et al., 2011, "White Paper: Voice and SMS in LTE," Rohde & Schwartz GmbH & Co. KG, 45 pp.

* cited by examiner

FACILITATING RESELECTION BY A WIRELESS COMMUNICATION DEVICE TO A FIRST NETWORK FROM A SECOND NETWORK AFTER TERMINATION OF A CIRCUIT SWITCHED FALLBACK VOICE CALL

FIELD OF THE DESCRIBED EMBODIMENTS

The described embodiments relate generally to wireless communications and more particularly to facilitating reselection by a wireless communication device to a first network from a second network after termination of a voice call for which a circuit switched fallback (CSFB) procedure was performed.

BACKGROUND

Cellular networks using newer radio access technology (RAT) systems, such as Long Term Evolution (LTE) systems, are being developed and deployed. Networks using these newer RATs often support faster data rates than networks utilizing legacy RATs, such as second generation (2G) and third generation (3G) RATs, including Universal Mobile Telecommunications System (UMTS) networks and Global System for Mobile Communications (GSM) networks. However, in some deployments, LTE and other new RATs may not fully support some services that can be handled by legacy networks. Accordingly, LTE networks are often co-deployed in overlapping regions with legacy networks and wireless communication devices may transition between RATs as services or coverage may require. For example, in some deployments, LTE networks are not capable of supporting voice calls. Accordingly, when a wireless communication device receives or initiates a voice call while connected to a network that supports data sessions, but not voice calls, the wireless communication device can perform a circuit switched fallback (CSFB) procedure to transition to a legacy network that supports voice calls.

Due to the faster data rates offered by LTE networks, devices are often configured to reselect to an LTE network, if available, subsequent to termination of a voice call for which a CSFB procedure has been performed. However, voice-centric wireless communication devices that are used for placing and receiving voice calls can encounter delays reselecting to LTE after conclusion of a voice call if the fallback took place as a multiple radio access bearer (RAB) call. In this regard, existing data sessions established on an LTE network prior to a CSFB procedure can yield to a multi-RAB call on a legacy network, as a circuit switched (CS) RAB can be established to support the voice call and a packet switched (PS) RAB can be established to support a PS data session. After termination of the voice call, the legacy network can release the CS RAB, but the device can remain in a Radio Resource Control (RRC) connected mode and may be unable to reselect to the LTE network due to the active PS RAB. As such, the device may be stuck on the legacy network until conclusion of the data session, or at least until a break in data transfer has allowed the device to transition to an idle state, CELL_PCH state, URA_PCH state, or other state from which reselection to the LTE network can be performed. Due to the lower data rates offered by the legacy network, user experience and quality of service can be degraded during the period for which the device remains on the legacy network following termination of the voice call.

SUMMARY OF THE DESCRIBED EMBODIMENTS

Some embodiments disclosed herein provide for facilitating reselection by a wireless communication device to a first network from a second network after termination of a voice call for which a CSFB procedure was performed. In this regard, a wireless communication device in accordance with some example embodiments can be configured to derive a predicted signal quality of a first network, such as an LTE network, after termination of a voice call without performance of an inter-radio access technology measurement of the first network. The wireless communication device of such embodiments can be configured to use the predicted signal quality to make a decision as to whether to release a PS RAB on the second network and trigger a device-forced reselection to the first network after termination of the voice call, or to remain on the second network and continue a packet switched session over the second network. In this regard, if the predicted signal quality satisfies a threshold signal quality, the wireless communication device of such embodiments can release the PS RAB and trigger a device-forced reselection to the first network. Accordingly, the wireless communication device can return to the first network more quickly following termination of a CSFB voice call if it is determined that there is a sufficient predicted signal quality, thus providing a higher QoS due to a faster data rate that can be supported by the first network. However, if the predicted signal quality does not satisfy the threshold signal quality, then the wireless communication device of such embodiments can determine that the device has moved outside of coverage of the first network during the voice call, or that the coverage of the first network is not of sufficient quality to support a data session. Accordingly, the device can remain on the second network in such situations rather than delaying the data session by blindly forcing a reselection only to have to return to the second network due to insufficient first network coverage.

In a first embodiment, a method for facilitating reselection by a wireless communication device to an LTE network from a legacy network after termination of a voice call for which a CSFB procedure was performed is provided. The method of the first embodiment can include performing measurement of the LTE network while the wireless communication device is connected to the LTE network; participating in a CSFB procedure to transition from the LTE network to the legacy network in response to initiation of the voice call; performing measurement of the legacy network during the voice call. The method of the first embodiment can further include determining based at least in part on one or more of the measurement of the LTE network or the measurement of the legacy network that the wireless communication device is in a mobility state; and deriving a predicted reference signal received power (RSRP) of the LTE network after termination of the voice call based at least in part on the measurement of the LTE network performed while the wireless communication device was connected to the LTE network. The method of the first embodiment can also include releasing a packet switched radio access bearer on the legacy network and attempting reselection to the LTE network in an instance in which the predicted RSRP satisfies a threshold RSRP; and remaining on the legacy network and continuing a packet switched session over the packet switched radio access bearer in an instance in which the predicted RSRP does not satisfy the threshold RSRP.

In a second embodiment, a wireless communication device is provided. The wireless communication device of the second embodiment can include at least one transceiver and processing circuitry coupled to the at least one transceiver. The at least one transceiver can be configured to transmit data to and receive data from a first network and a second network. The processing circuitry can be configured to control the wireless communication device of the second embodiment to at least perform measurement of the first network while the wireless communication device is connected to the first network; participate in a CSFB procedure to transition from the first network to the second network in response to initiation of a voice call; and perform measurement of second legacy network during the voice call. The processing circuitry can be configured to further control the wireless communication device of the second embodiment to determine based at least in part on one or more of the measurement of the first network or the measurement of the second network that the wireless communication device is in a mobility state; and derive a predicted signal quality of the first network after termination of the voice call based at least in part on the measurement of the first network performed while the wireless communication device was connected to the first network. The processing circuitry can be configured to additionally control the wireless communication device of the second embodiment to release a packet switched radio access bearer on the second network and attempt reselection to the first network in an instance in which the predicted signal quality satisfies a threshold signal quality; and remain on the second network and continue a packet switched session over the packet switched radio access bearer in an instance in which the predicted signal quality does not satisfy the threshold signal quality.

In a third embodiment, a computer program product for facilitating reselection by a wireless communication device to a first network from a second network after termination of a voice call for which a CSFB procedure was performed is provided. The computer program product of the third embodiment can include at least one non-transitory computer readable storage medium having program code stored thereon. The program code of the third embodiment can include program code for performing measurement of the first network while the wireless communication device is connected to the first network; program code for participating in a CSFB procedure to transition from the first network to the second network in response to initiation of the voice call; and program code for performing measurement of the second network during the voice call. The program code of the third embodiment can further include program code for determining based at least in part on one or more of the measurement of the first network or the measurement of the second network that the wireless communication device is in a mobility state; and program code for deriving a predicted signal quality of the first network after termination of the voice call based at least in part on the measurement of the first network performed while the wireless communication device was connected to the first network. The program code of the third embodiment can additionally include program code for releasing a packet switched radio access bearer on the second network and attempting reselection to the first network in an instance in which the predicted signal quality satisfies a threshold signal quality; and program code for remaining on the second network and continuing a packet switched session over the packet switched radio access bearer in an instance in which the predicted signal quality does not satisfy the threshold signal quality.

In a fourth embodiment, an apparatus for facilitating reselection by a wireless communication device to a first network from a second network after termination of a voice call for which a CSFB procedure was performed is provided. The apparatus of the fourth embodiment can include means for performing measurement of the first network while the wireless communication device is connected to the first network; means for participating in a CSFB procedure to transition from the first network to the second network in response to initiation of the voice call; and means for performing measurement of the second network during the voice call. The apparatus of the fourth embodiment can further include means for determining based at least in part on one or more of the measurement of the first network or the measurement of the second network that the wireless communication device is in a mobility state; and means for deriving a predicted signal quality of the first network after termination of the voice call based at least in part on the measurement of the first network performed while the wireless communication device was connected to the first network. The apparatus of the fourth embodiment can additionally include means for releasing a packet switched radio access bearer on the second network and attempting reselection to the first network in an instance in which the predicted signal quality satisfies a threshold signal quality; and means for remaining on the second network and continuing a packet switched session over the packet switched radio access bearer in an instance in which the predicted signal quality does not satisfy the threshold signal quality.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some embodiments disclosed herein provide for facilitating reselection by a wireless communication device to a first network from a second network after termination of a voice call for which a CSFB procedure was performed. In this regard, some example embodiments provide for more robust device triggered reselection to the first network subsequent to termination of a CSFB call in instances in which the device has an active PS session and an established PS RAB on the second network following termination of the voice call and release of the CS RAB. More particularly, some example embodiments provide for intelligent enabling/disabling of device triggered reselection following voice call termination on the basis of a predicted signal quality of the first network. The predicted signal quality can thus be used to avoid blindly releasing the PS RAB on the second network and attempting reselection to the first network in situations in which the device has moved out of coverage range of the first network due to mobility, such as situations illustrated in and described below with respect to FIGS. 1-3.

Figure 1:
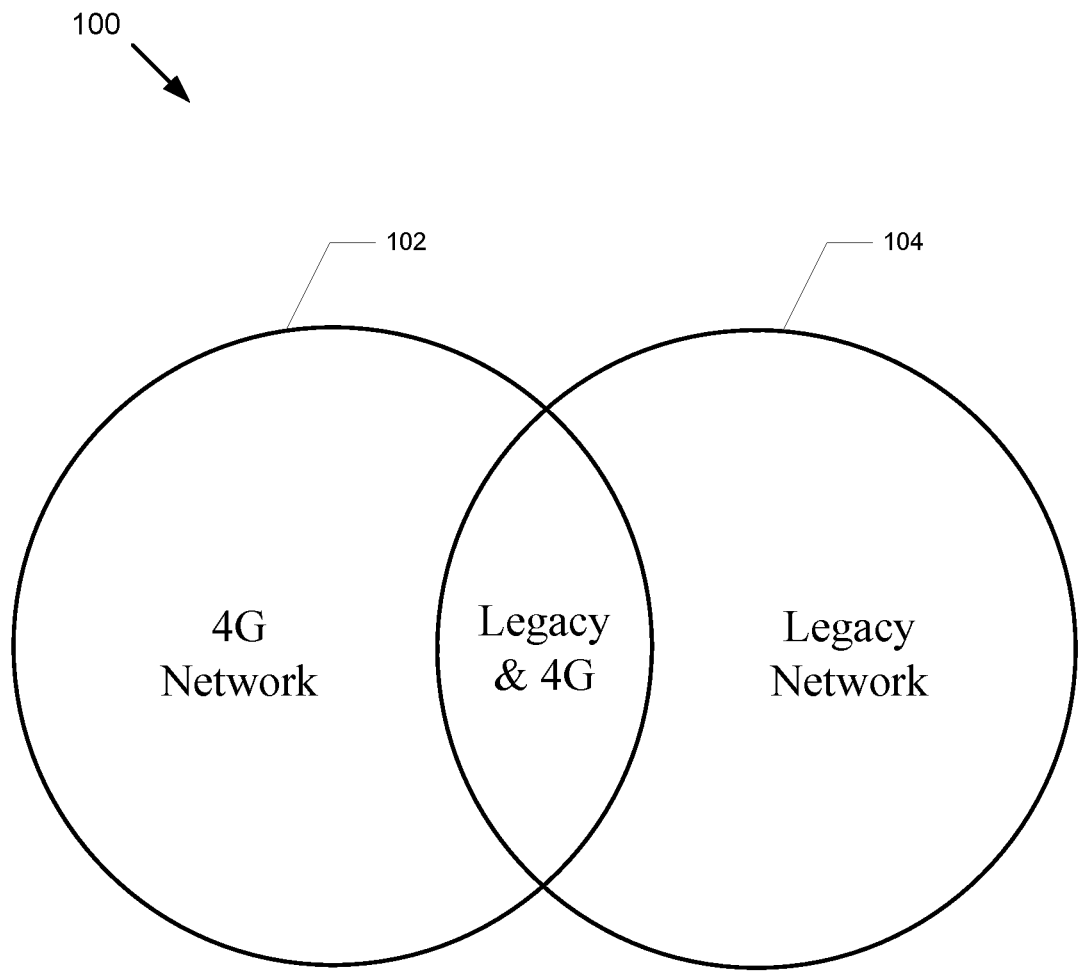
FIG. 1 illustrates overlapping coverage of a fourth generation network and a legacy network in accordance with some example embodiments.

FIG. 1 illustrates overlapping coverage of a fourth generation (4G) network 102 and a legacy network 104 in a communications system 100 in accordance with some example embodiments. The 4G network 102 can, for example, be an LTE network or other network that can offer faster data rates than legacy networks, such as 2G and 3G networks, but may not support voice calls. It will be appreciated that the 4G network is illustrated by way of example, and not by way of limitation. In this regard, other networks in existence now or that may be developed in the future that offer higher data rates but that do not support circuit switched (CS) voice calls can be substituted for the 4G network 102 within the scope of the disclosure. The legacy network 104 can, for example, be a Universal Mobile Telecommunications System (UMTS) or other 3G network, a Global System for Mobile Communications (GSM) or other 2G network, or other legacy network that can support CS voice calls, but that has lower data rates than the 4G network 102.

The 4G network 102 and legacy network 104 can each have regions of coverage represented by the respective circles illustrated in FIG. 1. The regions of coverage can overlap, such as illustrated by the overlapping portions of the circles in FIG. 1. A wireless communication device in accordance with some example embodiments can operate on both the 4G network 102 and the legacy network 104. Thus, for example, when the wireless communication device is in a region of overlapping coverage, the wireless communication device can be connected to the 4G network 102 and can perform a CSFB procedure to the legacy network 104 in response to initiation of a voice call.

Due to mobility of the wireless communication device, the wireless communication device can move outside of the coverage range of the 4G network 102 during a CSFB voice call. As such, if the wireless communication device blindly releases a PS RAB on the legacy network 104 and attempts reselection to the 4G network 102 following termination of the voice call, the 4G network 102 can be unavailable, or may not provide a sufficient signal quality to support reselection to the 4G network 102 and resumption of a data session over the 4G network 102.

As a more particular example, a wireless communication device having an active data session on an LTE network can perform a CSFB procedure to transition from the LTE network to a UMTS network in response to initiation of a voice call. After performance of the CSFB procedure, the device can have a multi-RAB (mRAB) connection to the UMTS network with a CS RAB for the voice call and a PS RAB for the data session. Subsequent to termination of the voice call, the device can be unaware of whether LTE coverage is available. In this regard, a device in CELL_FACH or CELL_DCH RRC state is not decoding system information block type 19 (SIB-19) used for LTE reselection criteria, and may not be aware of the existence of LTE coverage due to lack of LTE inter-radio access technology (inter-RAT) measurements (e.g., compressed mode UMTS to LTE B1/B2 measurements). Should the device release the PS RAB on the UMTS network and attempt reselection to the LTE network without waiting for WCDMA Idle/URA_PCH/CELL_PCH to LTE reselection or NW controlled UMTS to LTE handover/redirection, there is no guarantee of finding suitable LTE coverage. Performing a device triggered forced LTE reselection in scenarios in which there is not suitable LTE coverage can result in several problematic scenarios.

Figure 2:
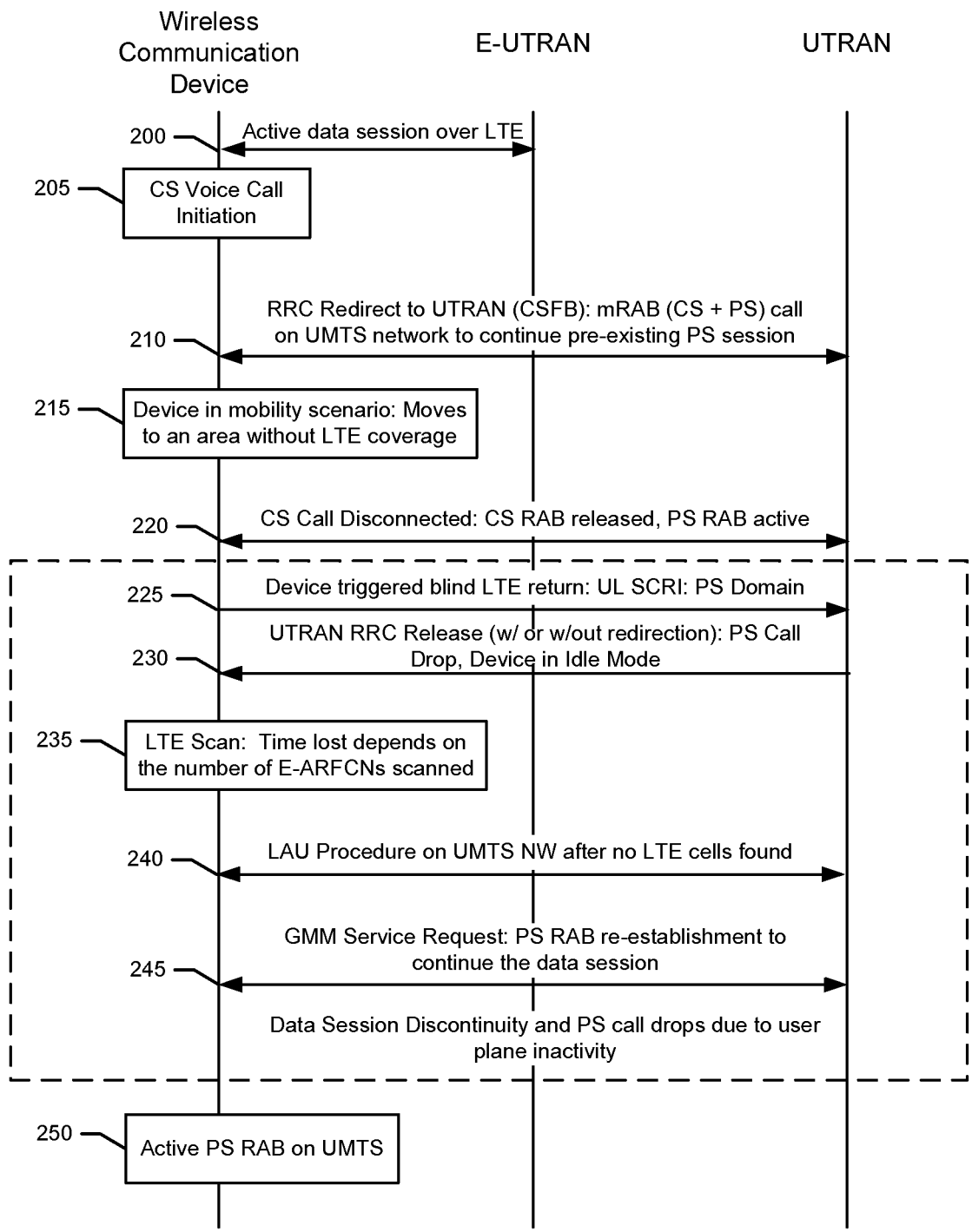
FIG. 2 illustrates an unnecessary data session discontinuity that can occur if a device triggered reselection is performed after a CSFB voice call when LTE coverage is unavailable.

As a first example problematic scenario, the network can release the PS RRC connection with normal cause and put the device in RRC idle mode, or can release the RRC connection with a re-direct to LTE. However, if the device has moved out of LTE coverage range (e.g., out of the range of the 4G network 102), the device may not find an LTE network and may have to return to the UMTS network. An example of this scenario is illustrated in FIG. 2. In the example of FIG. 2, a wireless communication device can be within coverage range of both an Evolved Universal Terrestrial Access Network (E-UTRAN) of an LTE network and a Universal Terrestrial Access Network (UTRAN) of a UMTS network at the time of initiation of a voice call, but can move out of coverage range of the UTRAN by the time at which the voice call terminates.

At operation 200, the wireless communication device can be connected to the LTE network and can establish an active data session over the LTE network. Operation 205 can include initiation of a CS voice call while the data session is still active. Operation 210 can include performing a CSFB procedure responsive to initiation of the voice call. The CSFB procedure can include the wireless communication device receiving an RRC redirect to the UTRAN access and transitioning to the UMTS network in response to the RRC redirect. An mRAB call with a CS RAB for the voice call and a PS RAB for the ongoing data session can be established on the UMTS network as part of the CSFB procedure.

As illustrated by block 215, the wireless communication device can be in a mobility state and can move to an area without LTE coverage. At operation 220, the CS voice call can be disconnected. As a result, the CS RAB on the UMTS network can be released. However, if the data session is still ongoing, the PS RAB on the UMTS network can remain active. In the example illustrated in FIG. 2, the wireless communication device can trigger a blind attempt to return to the LTE network at operation 225 by sending an uplink (UL) signaling connection release indication (SCRI) to the PS domain on the UMTS network. Operation 230 can include the wireless communication device receiving an RRC release message from the UTRAN. The release can be without redirection, or can include a redirection to the LTE network. As a result of the RRC release message, the PS call (e.g., the data session) can be dropped and the wireless communication device can move to idle mode.

Operation 235 can include the wireless communication device scanning for the LTE network. The time taken to perform operation 235 by the wireless communication device can depend on the number of E-UTRAN absolute radio frequency channel numbers (E-ARFCNs) scanned. Since the wireless communication device has moved outside of the LTE coverage area in the example of FIG. 2, the wireless communication device does not find an LTE cell and engages in a location area update (LAU) procedure on the UMTS network, at operation 240. Operation 245 can include the wireless communication device sending a Global Packet Radio Service Mobility Management (GMM) service request to the UTRAN and reestablishing a PS RAB on the MTS network to continue the data session. Subsequent to operation 245, the wireless communication device can have an active PS RAB on the UMTS network, as illustrated by block 250. The period inclusive of operations 225-245, as illustrated by the dashed line box, can result in discontinuity of the data session and, in some instances, PS call drops due to user plane inactivity. In this regard, operations 225-245 result in interruption of the data session only to see the wireless communication device return to the UMTS network as a result of not finding the LTE network after the device triggered attempt to reselect to the LTE network. In many instances, the time taken to reestablish the UMTS PS RAB can take between 20 and 40 seconds. Accordingly, user experience and quality of service for the data session can suffer. Further, sending the SCRI message and then reestablishing the UMTS PS RAB in the scenario illustrated in FIG. 2 results in unnecessary network signaling that can impose a burden on the UMTS network.

Figure 3:
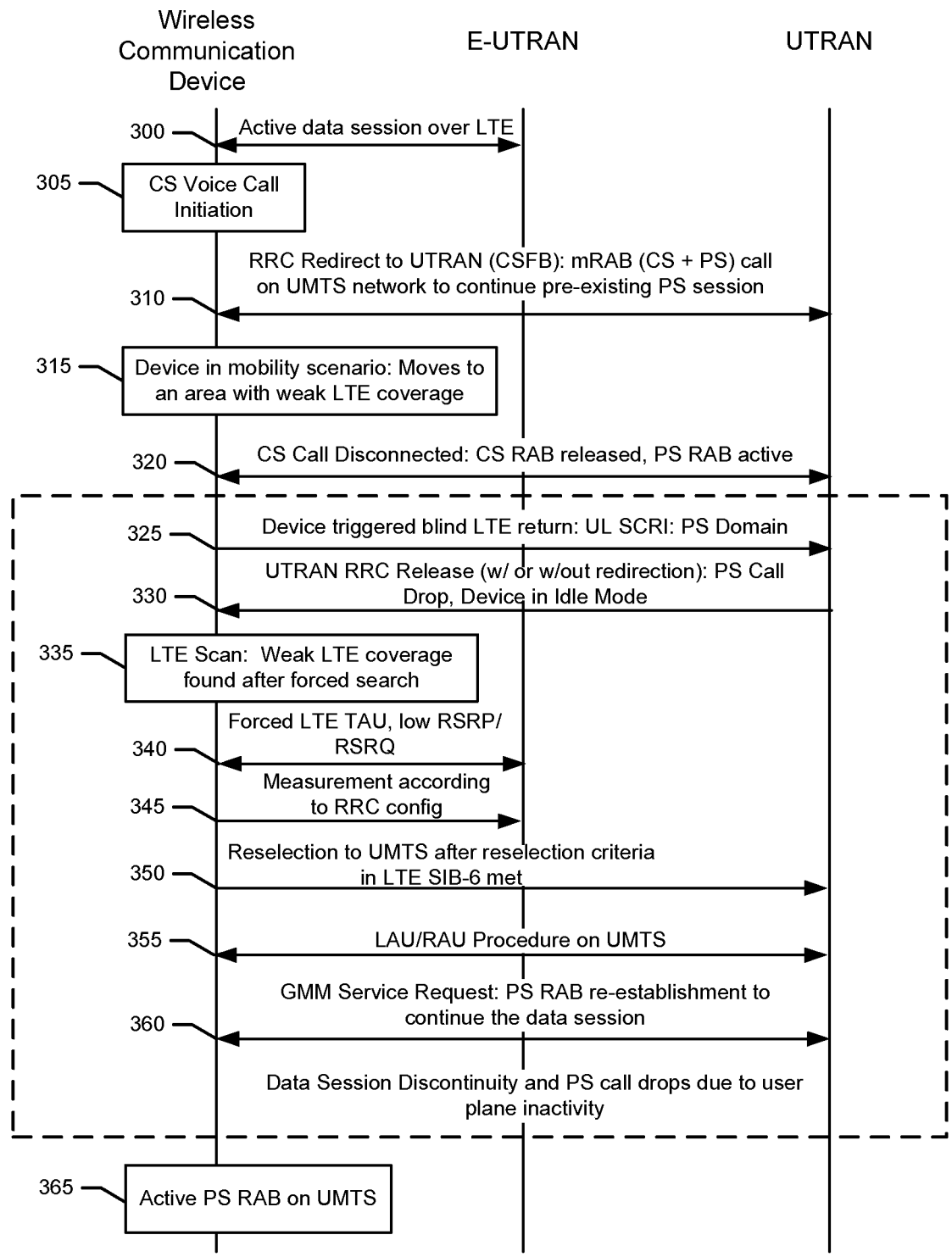
FIG. 3 illustrates an unnecessary data session discontinuity that can occur if a device triggered reselection is performed after a CSFB voice call when only weak LTE coverage is available.

As a second example problematic scenario, a wireless communication device can trigger a forced LTE reselection and find weaker LTE coverage compared to the LTE coverage before the CSFB call. In this scenario, after searching for and reselecting to the LTE network, the wireless communication device can find that the quality of the LTE network does not satisfy selection criteria (S-criteria). As such, the wireless communication device can have to reselect back to UMTS after failing the S-criteria, resulting in a ping-pong effect. An example of this scenario is illustrated in FIG. 3. In the example of FIG. 3, a wireless communication device can be within coverage range of both an Evolved Universal Terrestrial Access Network (E-UTRAN) of an LTE network and a Universal Terrestrial Access Network (UTRAN) of a UMTS network at the time of initiation of a voice call, but due to mobility can move into an area of weaker coverage of the UTRAN by the time at which the voice call terminates.

At operation 300, the wireless communication device can be connected to the LTE network and can establish an active data session over the LTE network. Operation 305 can include initiation of a CS voice call while the data session is still active. Operation 310 can include performing a CSFB procedure responsive to initiation of the voice call. The CSFB procedure can include the wireless communication device receiving an RRC redirect to the UTRAN access and transitioning to the UMTS network in response to the RRC redirect. An mRAB call with a CS RAB for the voice call and a PS RAB for the ongoing data session can be established on the UMTS network as part of the CSFB procedure.

As illustrated by block 315, the wireless communication device can be in a mobility state and can move to an area with weak LTE coverage. At operation 320, the CS voice call can be disconnected. As a result, the CS RAB on the UMTS network can be released. However, if the data session is still ongoing, the PS RAB on the UMTS network can remain active. In the example illustrated in FIG. 3, the wireless communication device can trigger a blind attempt to return to the LTE network at operation 325 by sending an uplink (UL) signaling connection release indication (SCRI) to the PS domain on the UMTS network. Operation 330 can include the wireless communication device receiving an RRC release message from the UTRAN. The release can be without redirection, or can include a redirection to the LTE network. As a result of the RRC release message, the PS call (e.g., the data session) can be dropped and the wireless communication device can move to idle mode.

Operation 335 can include the wireless communication device scanning for the LTE network. In the example of FIG.

3, weak LTE coverage is found as a result of the forced search. Operation 340 can include the wireless communication device sending a tracking area update (TAU) to the E-UTRAN and attaching to the LTE network. The wireless communication device a find a low RSRP and/or a low reference signal received quality (RSRQ) on the LTE network. At operation 345, the wireless communication device can perform a measurement of the LTE network in accordance with an RRC configuration. At operation 350, the wireless communication device can perform a reselection to the UMTS network, as reselection criteria in LTE SIB-6 can be met as a result of the low RSRP/RSRQ of the LTE network. Operation 355 can include the wireless communication device engaging in a LAU and routing area update (RAU) on the UMTS network. Operation 360 can include the wireless communication device sending a Global Packet Radio Service Mobility Management (GMM) service request to the UTRAN and reestablishing a PS RAB on the MTS network to continue the data session. Subsequent to operation 360, the wireless communication device can have an active PS RAB on the UMTS network, as illustrated by block 365. The period inclusive of operations 325-360, as illustrated by the dashed line box, can result in discontinuity of the data session and, in some instances, PS call drops due to user plane inactivity. In this regard, operations 325-360 result in interruption of the data session only to see the wireless communication device return to the UMTS network as a result of not finding the LTE network after the device triggered attempt to reselect to the LTE network. In many instances, the time taken to reestablish the UMTS PS RAB can take between 20 and 40 seconds. Accordingly, user experience and quality of service for the data session can suffer. Further, sending the SCRI message and then reestablishing the UMTS PS RAB in the scenario illustrated in FIG. 3 results in unnecessary network signaling that can impose a burden on the UMTS network.

Some example embodiments address the problematic scenarios illustrated in and described with respect to FIGS. 2 and 3. In this regard, some example embodiments, such as those discussed further herein below with respect to FIGS. 4-15, provide a wireless communication device configured to determine a predicted signal quality of a first network after termination of a CSFB call and to use the predicted signal quality to determine whether to initiate a device-triggered forced reselection to the first network.

Figure 4:
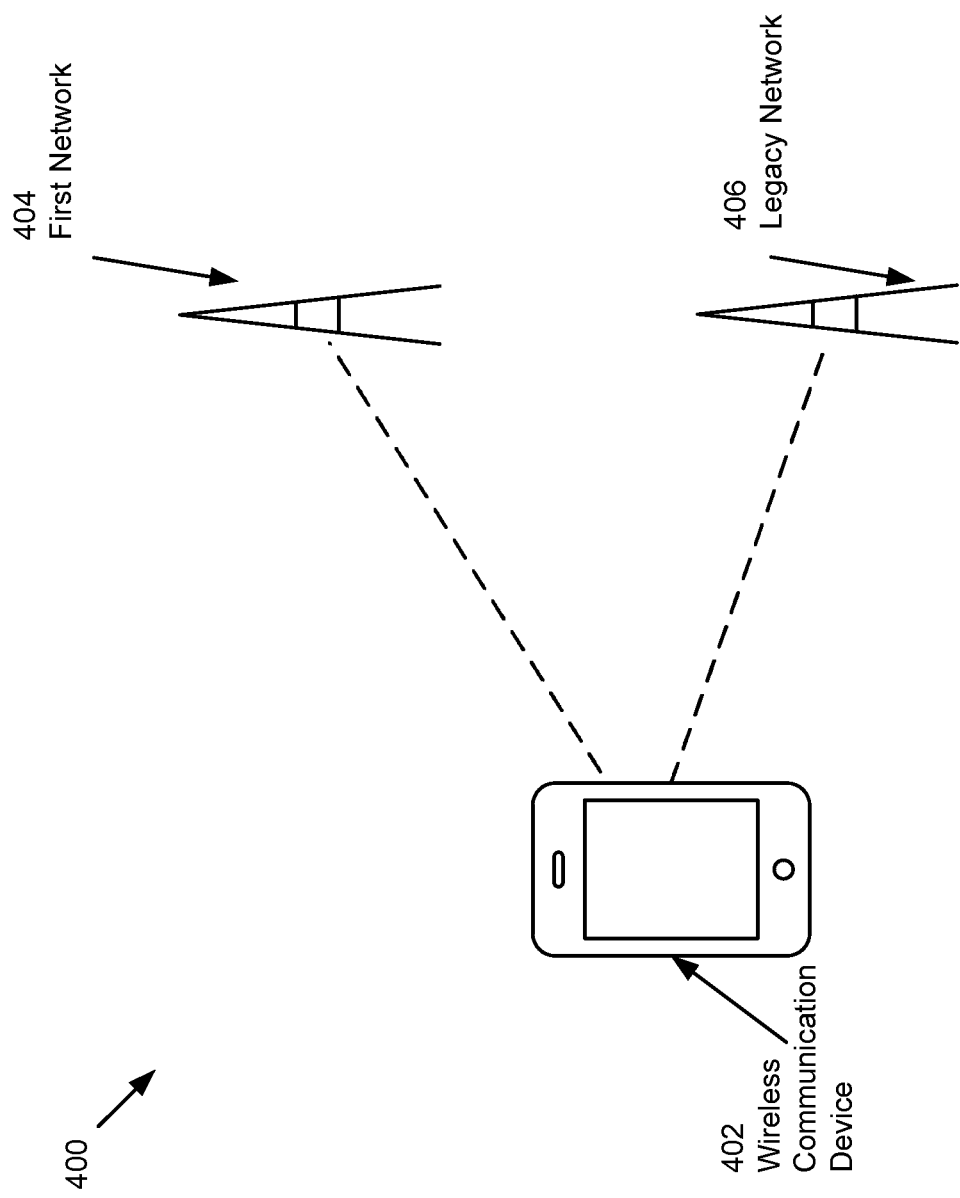
FIG. 4 illustrates a wireless communication system in accordance with some example embodiments.

FIG. 4 illustrates an example system 400 having multiple wireless communication networks to which a wireless communication device 402 can connect in accordance with some example embodiments. By way of non-limiting example, the wireless communication device 402 can be a cellular phone, such as a smart phone device, a tablet computing device, a laptop computing device, or other computing device configured to operate within both a first network 404 and a legacy network 406. In some example embodiments, such as those in which the first network 404 is an LTE network, the wireless communication device 402 can be a user equipment (UE). The first network 404 can be any network supporting packet switched (PS) data sessions, and can have higher data rates than the legacy network 406. However, the first network 404 can be a network that does not support CS voice calls. Thus, for example, the first network 404 can be an LTE or other 4G network, such as the 4G network 102 illustrated in FIG. 1. The legacy network 406 can be any network supporting CS voice calls. However, the legacy network 406 can have lower data rates than the first network 404. By way of non-limiting example, the legacy network 406 can be a UMTS or other 3G network, a GSM or other 2G network, or other legacy network that can support CS voice calls, but that has lower data rates than the first network 404. In this regard, the legacy network 406 can be the legacy network 104.

As illustrated in FIG. 4, the wireless communication device 402 can be within signaling range of both a base station or other access point for the first network 404 and a base station or other access point for the legacy network 406 at the time of initiation of a voice call. In some deployments an access point for the first network 404 and an access point for the legacy network 406 can be co-located. In this regard, the wireless communication device 402 can be located in a region of overlapping coverage of the first network 404 and the legacy network 406. Accordingly, the wireless communication device 402 can connect to the first network 404. In response to initiation of a CS voice call (e.g., a mobile originating voice call initiated by the wireless communication device 402 or a mobile terminating voice call placed to the wireless communication device 402), the wireless communication device 402 can participate in a CSFB procedure to the legacy network 406 so that the voice call can be supported.

Figure 5:
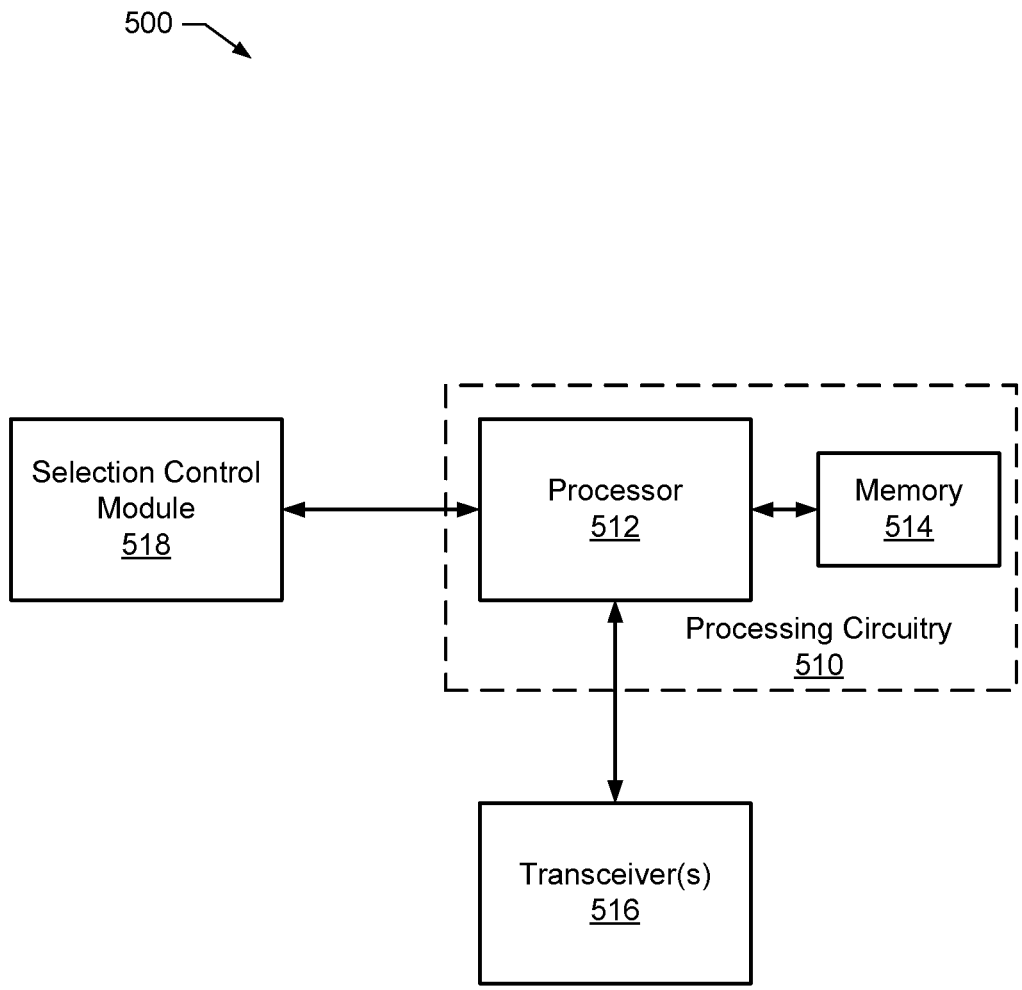
FIG. 5 illustrates a block diagram of an apparatus that can be implemented on a wireless communication device in accordance with some example embodiments.

FIG. 5 illustrates a block diagram of an apparatus 500 that can be implemented on a wireless communication device 402 in accordance with some example embodiments. In this regard, when implemented on a computing device, such as wireless communication device 402, apparatus 500 can enable the computing device to operate within the system 400 in accordance with one or more example embodiments. It will be appreciated that the components, devices or elements illustrated in and described with respect to FIG. 5 below may not be mandatory and thus some may be omitted in certain embodiments. Additionally, some embodiments can include further or different components, devices or elements beyond those illustrated in and described with respect to FIG. 5.

In some example embodiments, the apparatus 500 can include processing circuitry 510 that is configurable to perform actions in accordance with one or more example embodiments disclosed herein. In this regard, the processing circuitry 510 can be configured to perform and/or control performance of one or more functionalities of the apparatus 500 in accordance with various example embodiments, and thus can provide means for performing functionalities of the apparatus 500 in accordance with various example embodiments. The processing circuitry 510 can be configured to perform data processing, application execution and/or other processing and management services according to one or more example embodiments.

In some embodiments, the apparatus 500 or a portion(s) or component(s) thereof, such as the processing circuitry 510, can include one or more chipsets, which can each include one or more chips. The processing circuitry 510 and/or one or more further components of the apparatus 500 can therefore, in some instances, be configured to implement an embodiment on a single chip or chipset. In some example embodiments in which one or more components of the apparatus 500 are embodied as a chipset, the chipset can be capable of enabling a computing device to operate in the system 400 when implemented on or otherwise operably coupled to the computing device. Thus, for example, one or more components of the apparatus 500 can provide a chipset configured to enable a computing device to operate over the first network 404 and/or the legacy network 406.

In some example embodiments, the processing circuitry 510 can include a processor 512 and, in some embodiments, such as that illustrated in FIG. 5, can further include memory 514. The processing circuitry 510 can be in communication with or otherwise control a transceiver(s) 516 and/or selection control module 518.

The processor 512 can be embodied in a variety of forms. For example, the processor 512 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 512 can comprise a plurality of processors. The plurality of processors can be in operative communication with each other and can be collectively configured to perform one or more functionalities of the apparatus 500 as described herein. In some example embodiments, the processor 512 can be configured to execute instructions that can be stored in the memory 514 or that can be otherwise accessible to the processor 512. As such, whether configured by hardware or by a combination of hardware and software, the processor 512 capable of performing operations according to various embodiments while configured accordingly.

In some example embodiments, the memory 514 can include one or more memory devices. Memory 514 can include fixed and/or removable memory devices. In some embodiments, the memory 514 can provide a non-transitory computer-readable storage medium that can store computer program instructions that can be executed by the processor 512. In this regard, the memory 514 can be configured to store information, data, applications, instructions and/or the like for enabling the apparatus 500 to carry out various functions in accordance with one or more example embodiments. In some embodiments, the memory 514 can be in communication with one or more of the processor 512, transceiver(s) 516, or selection control module 518 via a bus(es) for passing information among components of the apparatus 500.

The apparatus 500 can further include transceiver(s) 516. The transceiver(s) 516 can enable the apparatus 500 to send wireless signals to and receive signals from one or more wireless networks, such as the first network 404 and the legacy network 406. As such, the transceiver(s) 516 can be configured to support any type of cellular or other wireless communication technology that may be implemented by the first network 404 and/or legacy network 406. In some example embodiments, the transceiver(s) 516 can include a single transceiver configured to enable the wireless communication device 402 to connect to both the first network 404 and the legacy network 406. Alternatively, in some example embodiments, the transceiver(s) 516 can include a first transceiver configured to enable the wireless communication device 402 to connect to the first network 404 and a second transceiver configured to enable the wireless communication device 402 to connect to the legacy network 406.

The apparatus 500 can further include selection control module 518. The selection control module 518 can be embodied as various means, such as circuitry, hardware, a computer program product comprising computer readable program instructions stored on a computer readable medium (for example, the memory 514) and executed by a processing device (for example, the processor 512), or some combination thereof. In some embodiments, the processor 512 (or the processing circuitry 510) can include, or otherwise control the selection control module 518.

The selection control module 518 can be configured in some example embodiments to determine situations in which the wireless communication device 402 is in a mobility state before and/or during a CSFB voice call. The selection control module 518 of some example embodiments can be further configured to determine a predicted signal quality of the first network 404 following termination of a voice call. The predicted signal quality can be derived without performing an inter-RAT measurement of the first network 404. The mobility state and predicted signal quality can be determined based at least in part on measurements of the first network 404 that can be performed prior to performance of the CSFB procedure and/or on measurements of the legacy network 406 that can be performed during the voice call. The measurements can, for example, include RSRP measurements, received signal code power (RSCP) measurements, received signal strength indication (RSSI) measurements, Doppler shift calculations (e.g., time-varying Doppler shift after time domain channel estimation), and/or other metrics that can be measured or calculated based on measurements of the first network 404 and/or legacy network 406. Based upon the mobility state and the predicted signal quality, the selection control module 518 of such example embodiments can be configured to determine whether to remain on the legacy network 406 or to release a PS RAB on the legacy network 406 and force a reselection to the first network 404 following termination of a CSFB voice call. The predicted signal quality can be a prediction of a worst case signal quality based on a mobility state of the wireless communication device 402. In this regard, the predicted signal quality can be used by the selection control module 518 to determine whether forced reselection is safe and advantageous so as to avoid scenarios such as those illustrated in and described with respect to FIGS. 2 and 3.

Figure 6:
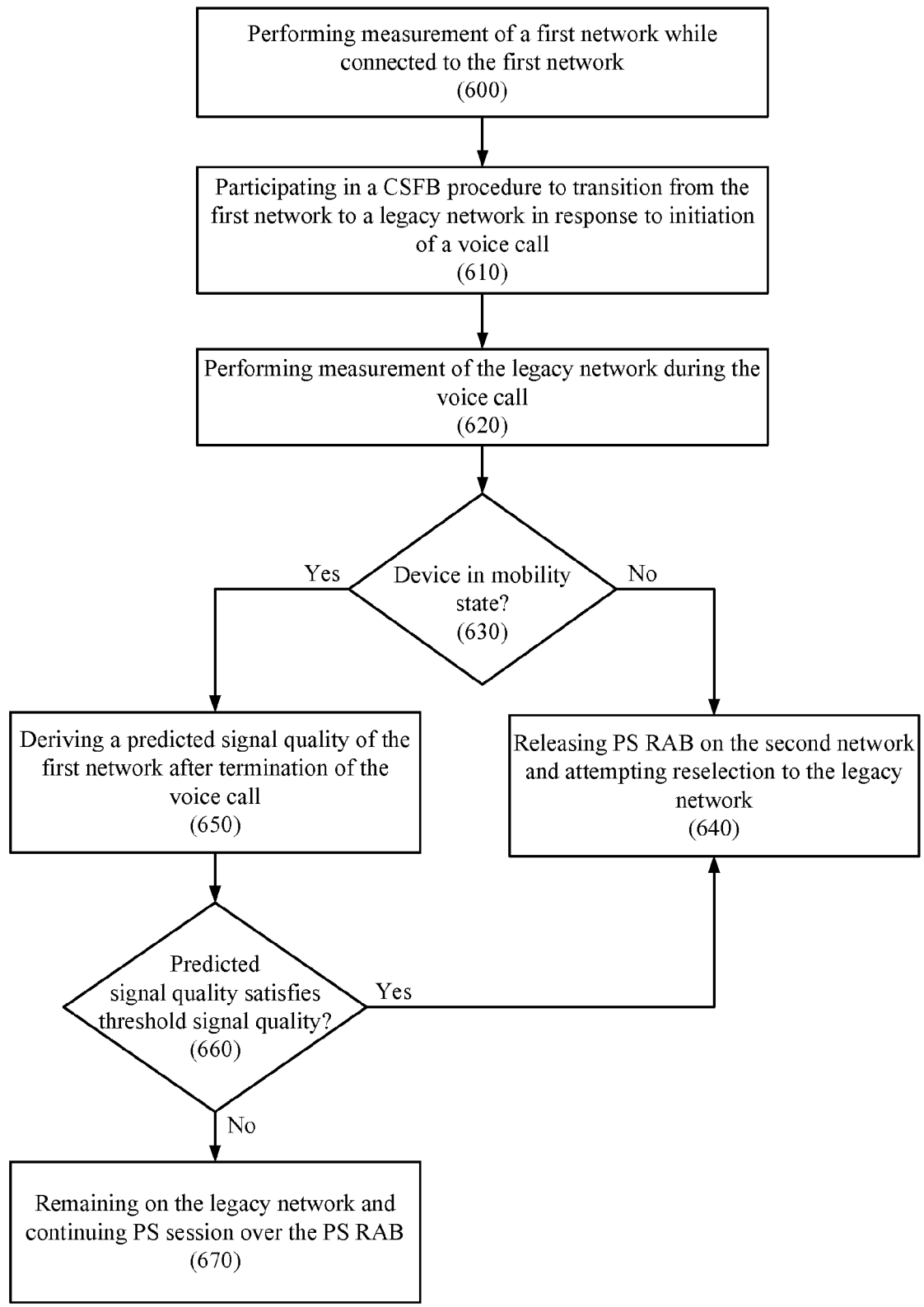
FIG. 6 illustrates a flowchart according to an example method for facilitating reselection by a wireless communication device to a first network from a second network after termination of a voice call for which a CSFB procedure was performed according to some example embodiments.

FIG. 6 illustrates a flowchart according to an example method for facilitating reselection by a wireless communication device to a first network from a second network after termination of a voice call for which a CSFB procedure was performed according to some example embodiments. In the method of FIG. 6, the wireless communication device 402 can be connected to the first network 404 and served by a serving cell of the first network 404. The wireless communication device 402 can additionally have an active data session established over the first network 404. Operation 600 can include the wireless communication device 402 performing measurement of the first network 404 while connected to the first network 404. Measurement of the first network 404 can include signal quality measurements, such as RSRP measurements (e.g., instantaneous RSRP measurements), RSSI measurements, and/or the like. Additionally or alternatively, measurement of the first network 404 can include calculation of Doppler shift values on the first network 404. One or more of processing circuitry 510, processor 512, memory 514, transceiver(s) 516, or selection control module 518 can, for example, provide means for performing operation 600.

Operation 610 can include the wireless communication device 402 participating in a CSFB procedure to transition from the first network 404 to the legacy network 406 in response to initiation of a voice call. One or more of processing circuitry 510, processor 512, memory 514, transceiver(s) 516, or selection control module 518 can, for example, provide means for performing operation 610. Operation 620 can include the wireless communication device 402 performing measurement of the legacy network 406 during the voice call. Measurement of the legacy network 406 can include signal quality measurements, such as RSCP measurements (e.g., instantaneous RSCP measurements), RSSI measurements, and/or the like. Additionally or alternatively, measurement of the legacy network 406 can include calculation of Doppler shift values on the legacy network 406. In some example embodiments, access points (e.g., cells) for the first network 404 and legacy network 406 can be co-located. As such, measurements made in operation 620 can be used as a proxy for determination of mobility away from a coverage area of the first network 404 and/or for predicting a signal quality of the first network 404 following voice call termination. One or more of processing circuitry 510, processor 512, memory 514, transceiver(s) 516, or selection control module 518 can, for example, provide means for performing operation 620.

Operation 630 can include determining whether the wireless communication device 402 is in a mobility state. This determination can be made based at least in part on the measurement of the first network 404 performed attendant to operation 600 and/or on the measurement of the legacy network 406 performed attendant to operation 620. The determination of whether the wireless communication device 402 is in a mobility state can be made based on any of a variety of methodologies, some of which are described herein below with respect to FIGS. 7-12. One or more of processing circuitry 510, processor 512, memory 514, transceiver(s) 516, or selection control module 518 can, for example, provide means for performing operation 630.

In an instance in which it is determined at operation 630 that the wireless communication device 402 is not in a mobility state, the method can proceed to operation 640, which can include releasing the PS RAB on the legacy network 406 and attempting reselection to the first network 404. In this regard, if the wireless communication device 402 is determined to not have been in a mobility state prior to or during the voice call, it can be considered safe to force a return to the first network 404 without risk of the wireless communication device 402 having moved outside of the coverage area of the first network 404 or finding only weak coverage and having to return to the legacy network 406. One or more of processing circuitry 510, processor 512, memory 514, transceiver(s) 516, or selection control module 518 can, for example, provide means for performing operation 640.

In an instance in which it is determined at operation 630 that the wireless communication device 402 is in a mobility state, the method can proceed to operation 650, which can include deriving a predicted signal quality of the first network 404 after termination of the voice call. The predicted signal quality can be determined without performing an inter-RAT measurement of the first network 404 following the CSFB procedure. The predicted signal quality of the first network 404 can, for example, be a predicted RSRP (e.g., a predicted worst case RSRP) of the first network 404. The predicted RSRP can, for example, be determined based at least in part on a last mean RSRP measured for the first network 404 prior to performance of the CSFB procedure in accordance with the methodology illustrated in and discussed with respect to FIGS. 13A and 13B and/or in accordance with the methodology illustrated in and discussed with respect to FIGS. 14A and 14B. One or more of processing circuitry 510, processor 512, memory 514, transceiver(s) 516, or selection control module 518 can, for example, provide means for performing operation 650.

Operation 660 can include comparing the predicted signal quality determined in operation 650 to a threshold signal quality and determining whether the predicted signal quality satisfies the threshold signal quality. The threshold signal quality can, for example, be predefined selection criteria (e.g., $RSRP_{S\text{-}criteria}$). In various embodiments, satisfaction of the threshold signal criteria can include determination that the predicted signal quality is greater than the threshold signal quality (predicted signal quality>threshold signal quality), or can include determination that the predicted signal quality is greater than or equal to the threshold signal quality (predicted signal quality>=threshold signal quality). One or more of processing circuitry 510, processor 512, memory 514, transceiver(s) 516, or selection control module 518 can, for example, provide means for performing operation 660.

In an instance in which it is determined at operation 660 that the predicted signal quality satisfies the threshold signal quality, the method can proceed to operation 640. In this regard, if it is determined that the predicted signal quality satisfies the threshold quality, it can be determined that even though the wireless communication device 402 may be in a mobility state, it can be safe to force a return to the first network 404, as the predicted signal quality indicates that the wireless communication device 402 remains within coverage range of the first network 404 after termination of the voice call. If, however, it is determined at operation 660 that the predicted signal quality does not satisfy the threshold signal quality, the method can proceed to operation 670, which can include remaining on the legacy network 406 and continuing the ongoing PS data session over the existing PS RAB on the legacy network 406. In this regard, if the predicted signal quality does not satisfy the threshold signal quality, it can be assumed that the wireless communication device 404 has moved outside of the coverage range of the first network 404 or that sufficient coverage is not available (e.g., the scenarios illustrated in and described with respect to FIGS. 2 and 3). As such, it may not be safe to force reselection to the first network 404 and unnecessary signaling overhead and delay of the PS session can be avoided. One or more of processing circuitry 510, processor 512, memory 514, transceiver(s) 516, or selection control module 518 can, for example, provide means for performing operation 670.

In some example embodiments, measurements of RSRP, RSCP, RSSI, Doppler shift, and/or the like can be measured on the first network 404 and/or legacy network 406 for use as mobility decision metrics due to the effect of large scale path loss (PL) and small scale fading on the measured values. In this regard, RSRP/RSCP/RSSI and Doppler shift values can reflect the large scale path loss and small scale time/frequency dispersive channel characteristics. The effect of large scale path loss and small scale fading on these metrics can be seen below in equations [1]-[5].

$$\text{Received Power in dBm} = \text{Transmitted Power in dBm} - \text{Large Scale } PL(\text{dB}) + \text{Small Scale Fading Power Gain} \quad [1]$$

$$\text{Large Scale } PL(\text{dB}) = 10n\log_{10}(d) + f(f_c, h_{BS}, h_{UT}) + \text{Shadowing}(X_\sigma) \quad [2]$$

$$h_b(t, \tau) = \sum_{n=1}^{N} A_n(t)e^{j2\pi f d_n(t)}e^{j2\pi f_c \tau_n}e^{j2\pi \phi_n}\delta(\tau - \tau_n) \quad [3]$$

$$fd_n = \frac{v}{\lambda}\cos\theta_n \quad [4]$$

$$\text{Small Scale Fading Power Gain} = 10 * \log_{10}\left[\left(\frac{\text{abs}(h_{total})}{2}\right)^2\right] \quad [5]$$

Taking the principles set forth in equations [1]-[5], several methodologies for determining the mobility state of the wireless communication device 402 and the predicted signal quality of the first network 404 will now be described with respect to FIGS. 7-14. The examples illustrated in and described with respect to FIGS. 7-14 are described with respect to embodiments in which the wireless communication device 402 transitions from an LTE network to a legacy network in response to a voice call. It will be appreciated, however, that the concepts illustrated in and described with respect to FIGS. 7-14 can be applied in embodiments in which the first network 404 is a network other than an LTE network as well.

In some example embodiments, RSRP measurements (e.g., instantaneous RSRP measurements) can be measured on the first network 404 prior to performance of the CSFB procedure, and RSCP measurements (e.g., instantaneous RSCP measurements) can be measured on the legacy network 406 during the voice call. A variance of the moving mean of the RSRP and RSCP measurements can be calculated and used to make the determination of operation 630. In this regard, Instantaneous RSRP/RSSI measurements on a serving LTE cell and RSCP/RSSI measurements on a serving cell can be passed through a mean calculating infinite impulse response (IIR) filter with a predefined time window, $T_{Window}$. Every $T_{window}$ seconds, the calculated mean can be stored in a circular buffer of size $N_{Buffer}$ that will be sent to a variance calculation block (e.g., linear regression method) to find the variance of the moving mean of RSRP and RSCP values. If the calculated variance of the moving means $\sigma^2_{RSRP}$ and $\sigma^2_{RSCP}$ satisfies (e.g., are greater than) a predefined variance threshold, $\sigma^2_{Threshold}$, it can be concluded that the wireless communication device 402 is in a mobility state and a mobility flag can be set. In some example embodiments, a baseband protocol stack RRC layer in the control plane can have access to instantaneous connected mode serving cell measurements, and can use these measurements to determine the variance of the moving means $\sigma^2_{RSRP}$ and $\sigma^2_{RSCP}$.

Figure 7:
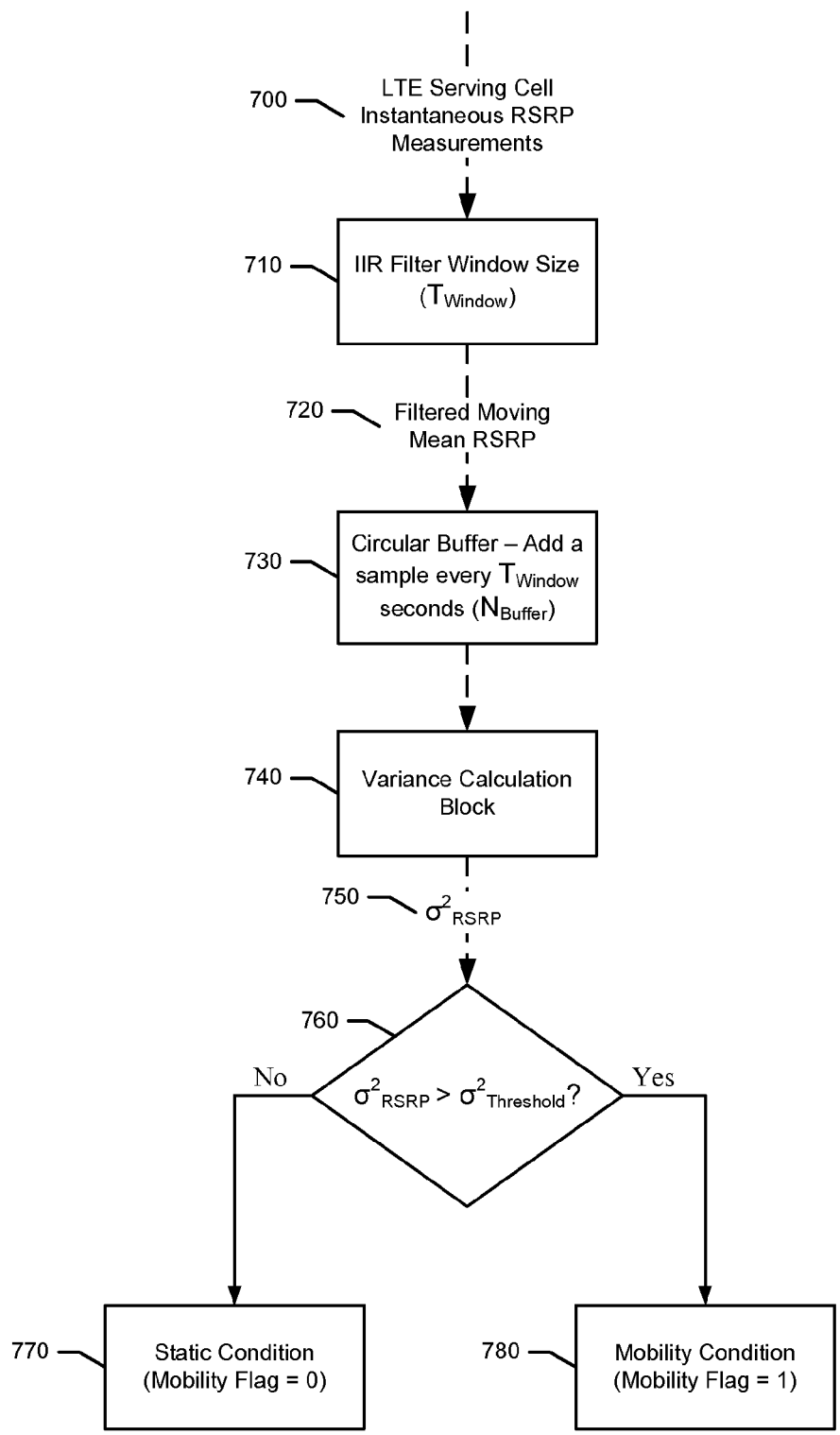
FIG. 7 illustrates a flowchart according to an example method for determining a mobility state of a wireless communication device prior to performance of a CSFB procedure based on variance of a moving mean of RSRP measurements according to some example embodiments.

FIG. 7 illustrates a flowchart according to an example method for determining a mobility state of a wireless communication device prior to performance of a CSFB procedure based on variance of a moving mean of RSRP measurements according to some example embodiments. Operation 700 can include performing instantaneous RSRP measurements of a serving LTE cell. The instantaneous RSRP measurements can be passed through an IIR filter having window size $T_{Window}$, as illustrated by block 710. The output of the filter block 710 can be a filtered moving mean RSRP 720. The filtered moving mean RSRP can be added to a circular buffer of size $N_{Buffer}$, as illustrated by block 730. In this regard, a sample can be added every $T_{window}$ seconds. The contents of the circular buffer can be passed to a variance calculation block 740, which can output the moving mean $\sigma^2_{RSRP}$ 750. The moving mean $\sigma^2_{RSRP}$ can be compared to the predefined variance threshold, $\sigma^2_{Threshold}$, at operation 760. If $\sigma^2_{RSRP}$ is determined to not be greater than $\sigma^2_{Threshold}$, then it can be determined that the wireless communication device 404 is not in a mobility state (e.g., a static condition) prior to the CSFB procedure, and the mobility flag can be set to 0, at operation 770. If, however, $\sigma^2_{RSRP}$ is determined to be greater than $\sigma^2_{Threshold}$, then it can be determined that the wireless communication device 404 is in a mobility state (e.g., a mobility condition) prior to the CSFB procedure, and the mobility flag can be set to 1, at operation 780.

Figure 8:
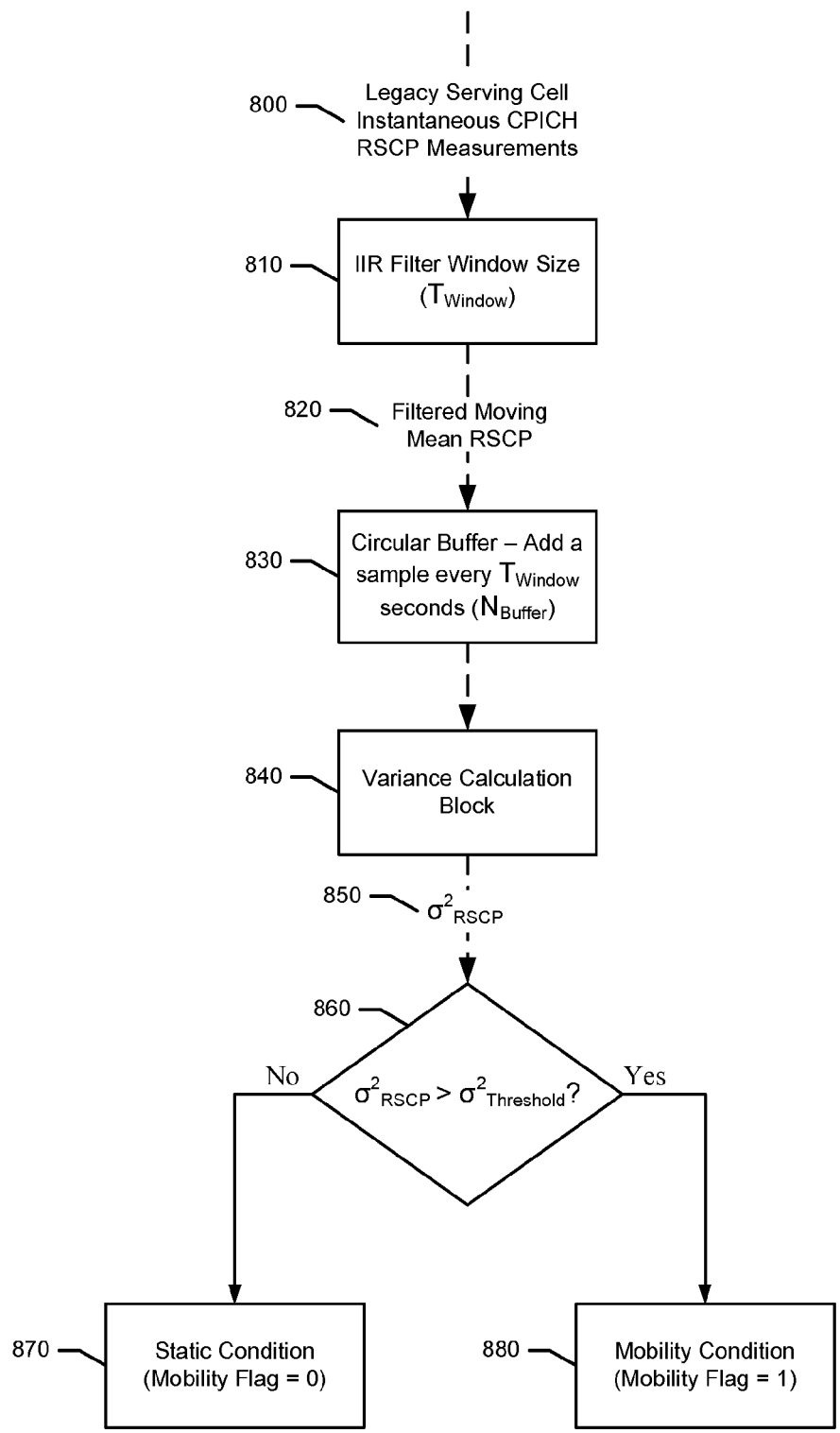
FIG. 8 illustrates a flowchart according to an example method for determining a mobility state of a wireless communication device after performance of a CSFB procedure based on variance of a moving mean of received signal code power measurements according to some example embodiments.

FIG. 8 illustrates a flowchart according to an example method for determining a mobility state of a wireless communication device after performance of a CSFB procedure based on variance of a moving mean of received signal code power measurements according to some example embodiments. Operation 800 can include performing instantaneous common pilot channel (CPICH) RSCP measurements of a serving legacy network cell. The instantaneous RSCP measurements can be passed through an IIR filter having window size $T_{Window}$, as illustrated by block 810. The output of the filter block 810 can be a filtered moving mean RSCP 820. The filtered moving mean RSCP 820 can be added to a circular buffer of size $N_{Buffer}$, as illustrated by block 830. In this regard, a sample can be added every $T_{Window}$ seconds. The contents of the circular buffer can be passed to a variance calculation block 840, which can output the moving mean $\sigma^2_{RSCP}$ 850. The moving mean $\sigma^2_{RSCP}$ can be compared to the predefined variance threshold, $\sigma^2_{Threshold}$, at operation 860. If $\sigma^2_{RSCP}$ is determined to not be greater than $\sigma^2_{Threshold}$, then it can be determined that the wireless communication device 404 is not in a mobility state (e.g., a static condition) during the voice call and the mobility flag can be set to 0, at operation 870. If, however, $\sigma^2_{RSCP}$ is determined to be greater than $\sigma^2_{Thresholds}$, then it can be determined that the wireless communication device 404 is in a mobility state (e.g., a mobility condition) during the voice call and the mobility flag can be set to 1, at operation 880.

Figure 9:
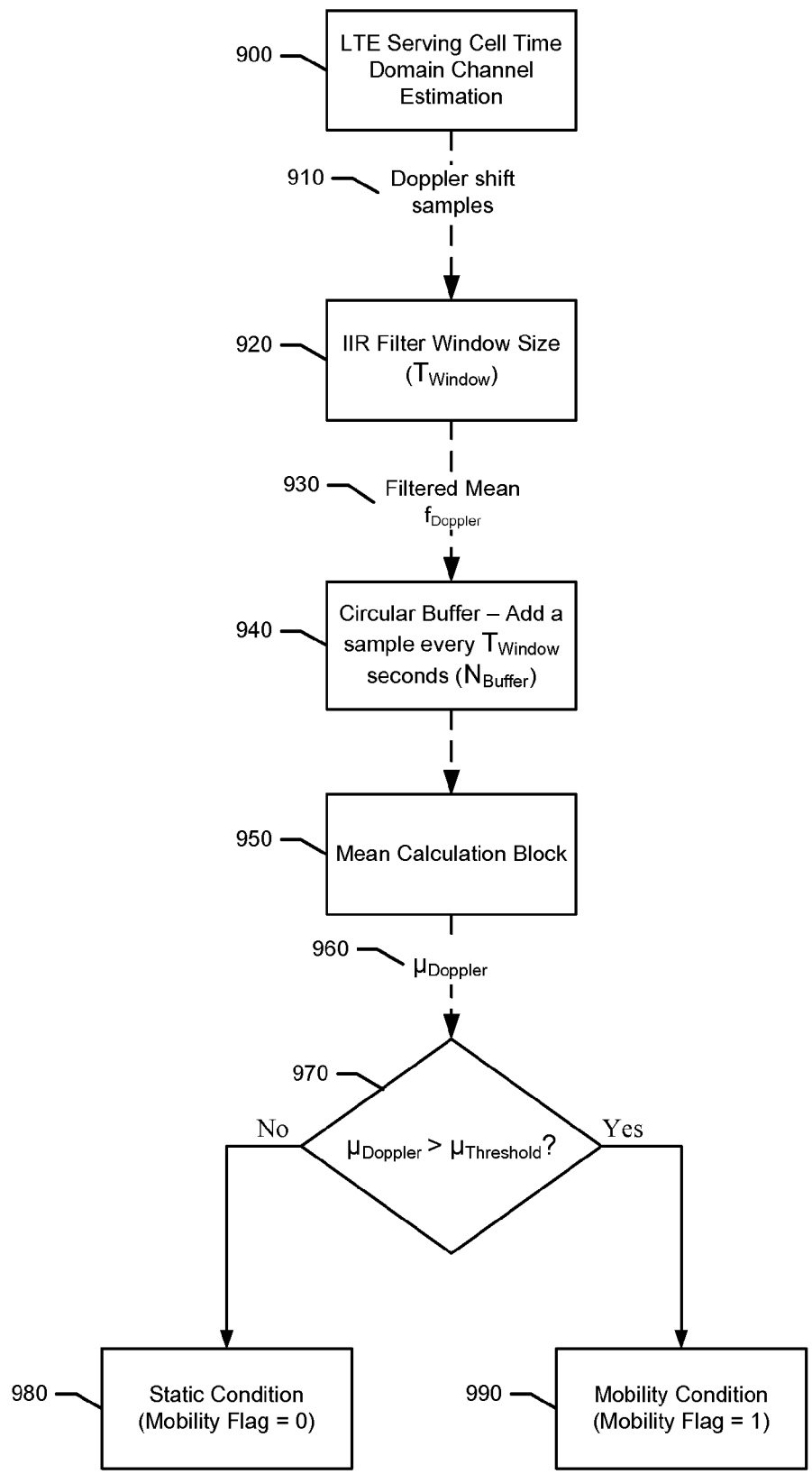
FIG. 9 illustrates a flowchart according to an example method for determining a mobility state of a wireless communication device prior to performance of a CSFB procedure based on a mean Doppler shift according to some example embodiments.
Figure 10:
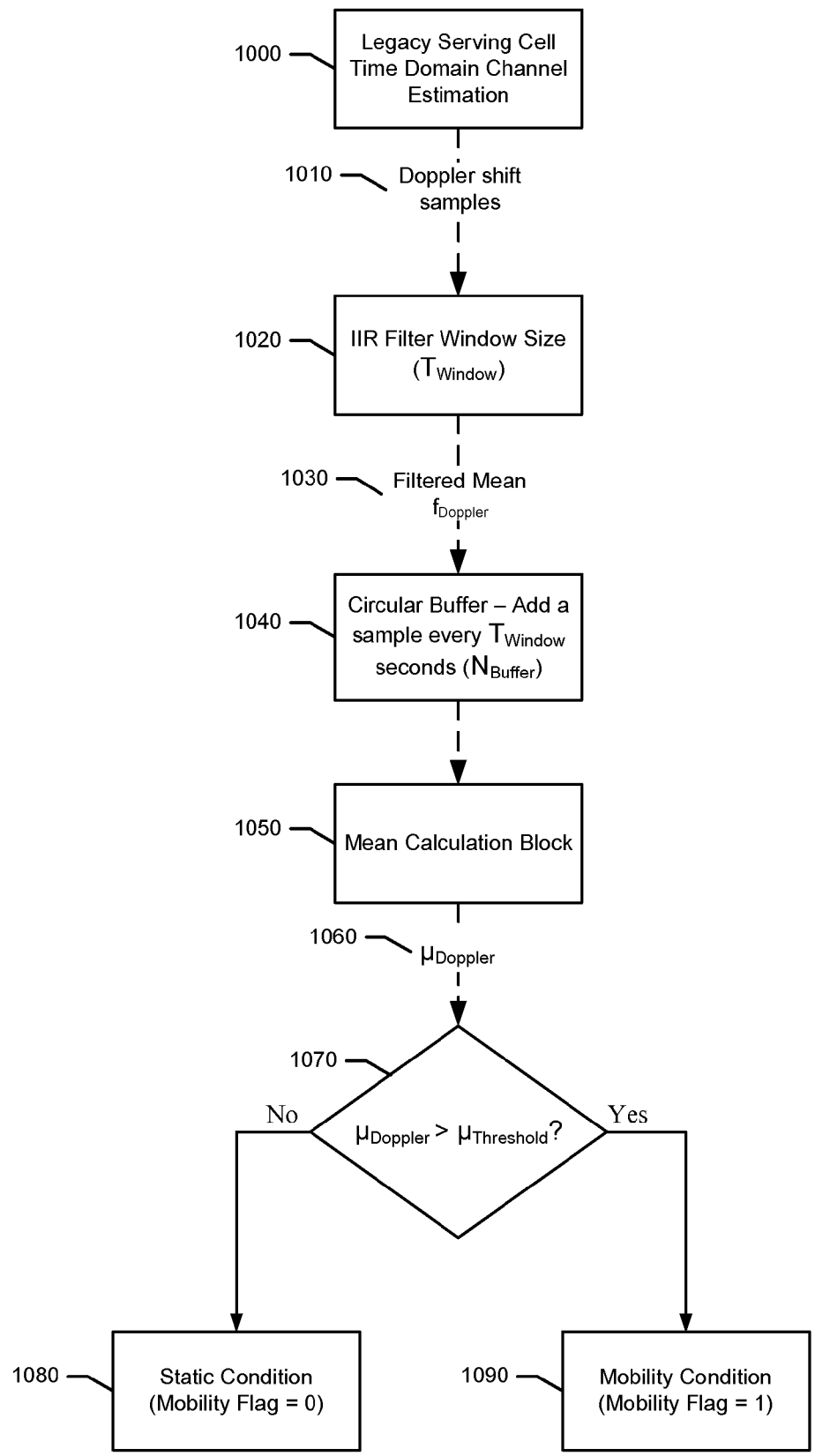
FIG. 10 illustrates a flowchart according to an example method for determining a mobility state of a wireless communication device after performance of a CSFB procedure based on a mean Doppler shift according to some example embodiments.

In some example embodiments, instantaneous Doppler shifts can be measured on the first network 404 prior to performance of the CSFB procedure, and Doppler shifts measurements can be measured on the legacy network 406 during the voice call. A mean of the moving means of Doppler shifts $f_{Doppler}$ can be determined after channel estimation on each RAT (e.g., the first network 404 and legacy network 406) to determine the receiver velocity. The value $\mu_{Doppler}$ can be used to make the determination of operation 630. In this regard, if $\mu_{Doppler}$ is greater than a threshold Doppler shift, $\mu_{Threshold}$, then it can be determined that the wireless communication device 402 is in a mobility state. In some such example embodiments, firmware can pass Doppler shifts observed after time varying channel estimation to the RRC layer to enable determination of whether the wireless communication device 402 is in a mobility state. FIGS. 9 and 10 are illustrative of mobility determination in accordance with such example embodiments.

FIG. 9 illustrates a flowchart according to an example method for determining a mobility state of a wireless communication device prior to performance of a CSFB procedure based on a mean Doppler shift according to some example embodiments. Operation 900 can include performing LTE serving cell time domain channel estimation. Doppler shift samples 910 can be determined on the basis of this estimation. The Doppler shift samples 910 can be passed through an IIR filter having window size $T_{Window}$, as illustrated by block 920. The output of the filter block 920 can be a filtered moving mean $f_{Doppler}$ 930. As illustrated by operation 940, $f_{Doppler}$ samples can be added to a circular buffer of size $N_{Buffer}$. In this regard, a sample can be added to the buffer every $T_{Window}$ seconds. The contents of the circular buffer can be passed to a mean calculation block 950, which can output the mean $\mu_{Doppler}$ 960. The mean $\mu_{Doppler}$ can be compared to the predefined threshold Doppler shift, $\mu_{Threshold}$, at operation 970. If $\mu_{Doppler}$ is determined to not be greater than $\mu_{Threshold}$, then it can be determined that the wireless communication device 404 is not in a mobility state (e.g., a static condition) prior to the CSFB procedure, and the mobility flag can be set to 0, at operation 980. If, however, $\mu_{Doppler}$ is determined to be greater than $\mu_{Threshold}$, then it can be determined that the wireless communication device 404 is in a mobility state (e.g., a mobility condition) prior to the CSFB procedure, and the mobility flag can be set to 1, at operation 990.

FIG. 10 illustrates a flowchart according to an example method for determining a mobility state of a wireless communication device after performance of a CSFB procedure based on a mean Doppler shift according to some example embodiments. Operation 1000 can include performing legacy network serving cell time domain channel estimation. Doppler shift samples 1010 can be determined on the basis of this estimation. The Doppler shift samples 1010 can be passed through an IIR filter having window size $T_{Window}$, as illustrated by block 1020. The output of the filter block 1020 can be a filtered moving mean $f_{Doppler}$ 1030. As illustrated by operation 1040, $f_{Doppler}$ samples can be added to a circular buffer of size $N_{Buffer}$. In this regard, a sample can be added to the buffer every $T_{window}$ seconds. The contents of the circular buffer can be passed to a mean calculation block 1050, which can output the mean $\mu_{Doppler}$ 1060. The mean $\mu_{Doppler}$ can be compared to the predefined threshold Doppler shift, $\mu_{Threshold}$, at operation 1070. If $\mu_{Doppler}$ is determined to not be greater than $\mu_{Threshold}$, then it can be determined that the wireless communication device 404 is not in a mobility state (e.g., a static condition) during the voice call and the mobility flag can be set to 0, at operation 1080. If, however, $\mu_{Doppler}$ is determined to be greater than $\mu_{Threshold}$, then it can be determined that the wireless communication device 404 is in a mobility state (e.g., a mobility condition) during the voice call and the mobility flag can be set to 1, at operation 1090.

Figure 11:
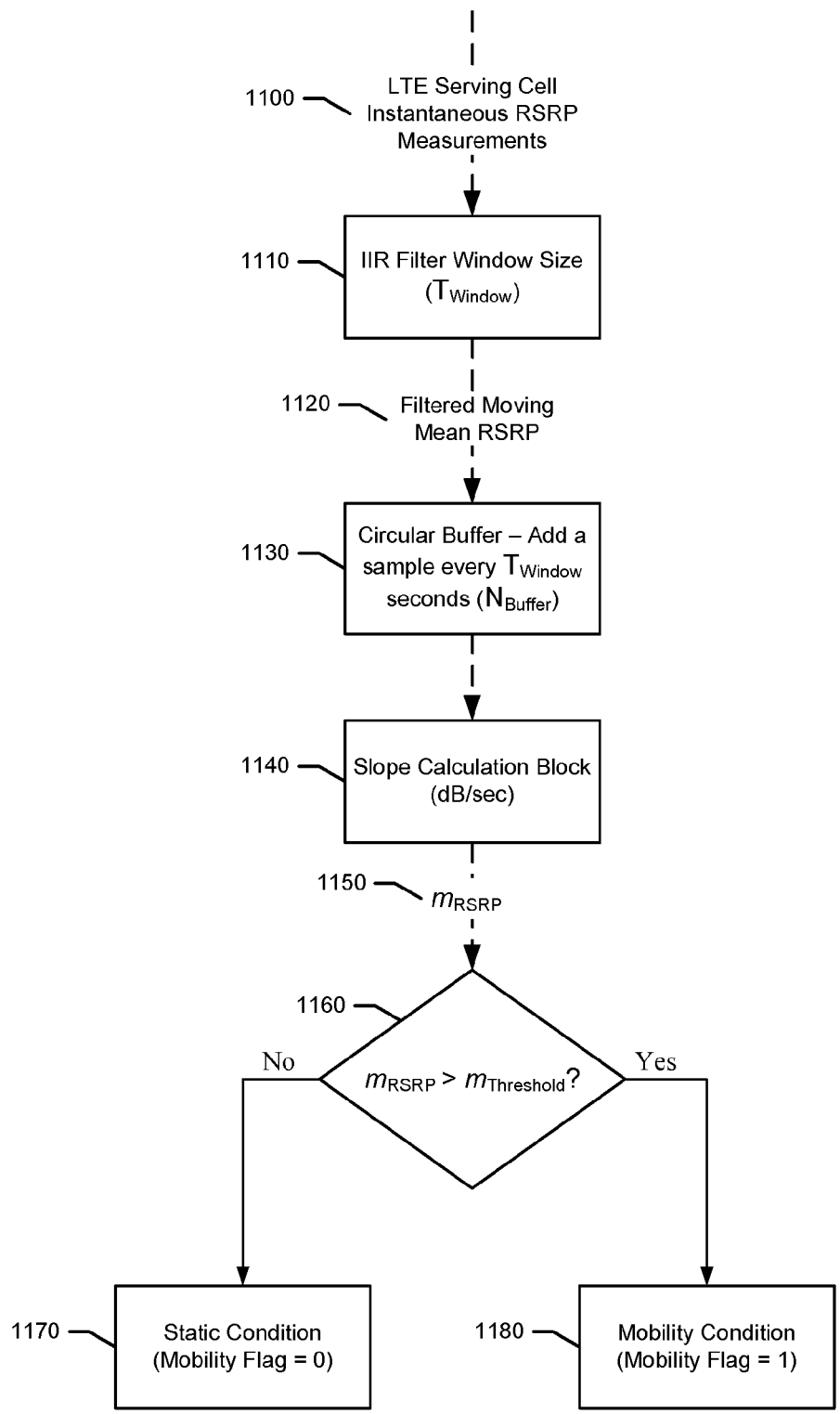
FIG. 11 illustrates a flowchart according to an example method for determining a mobility state of a wireless communication device prior to performance of a CSFB procedure based on a slope of a moving mean of RSRP measurements according to some example embodiments.
Figure 12:
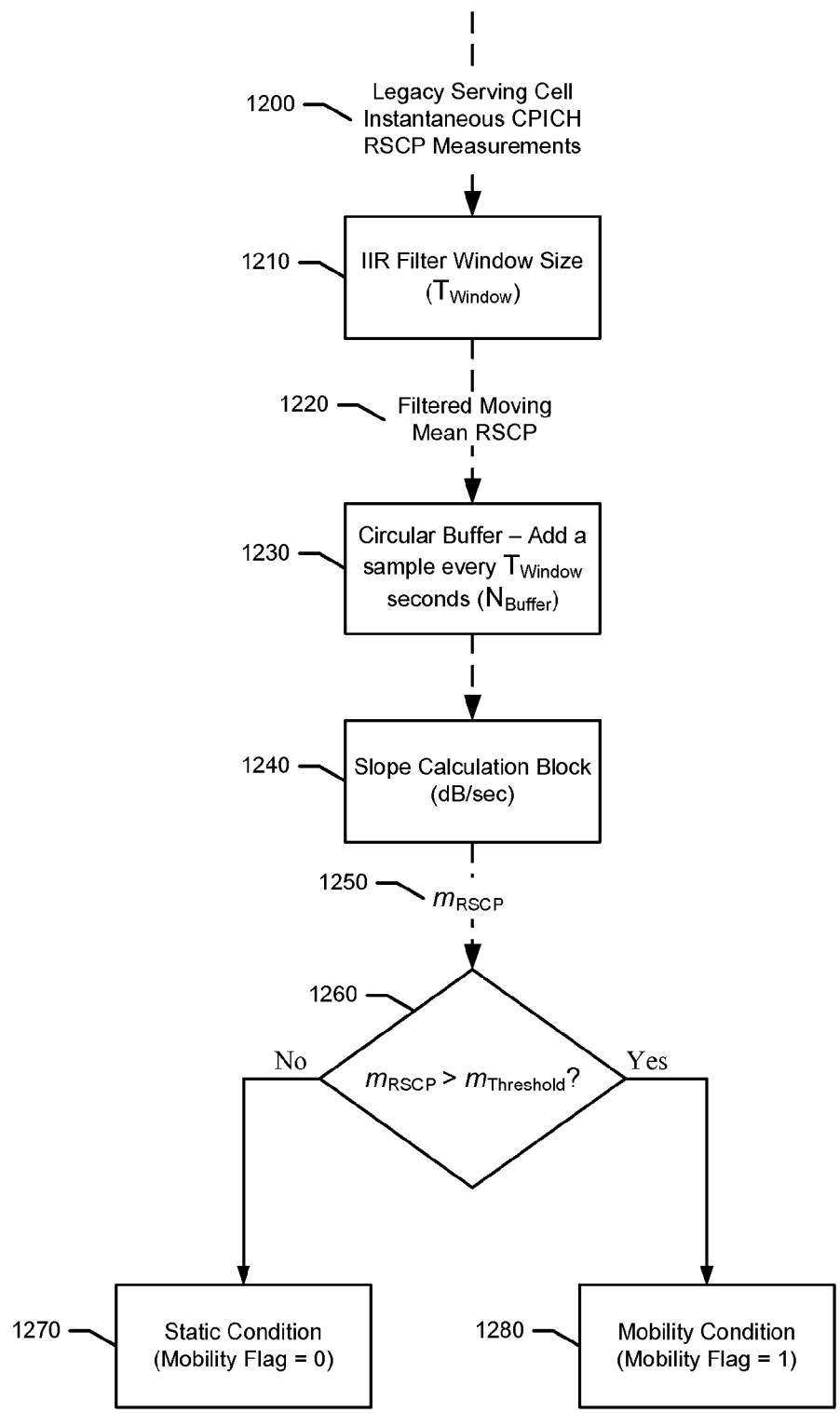
FIG. 12 illustrates a flowchart according to an example method for determining a mobility state of a wireless communication device after performance of a CSFB procedure based on a slope of a moving mean of received signal code power measurements according to some example embodiments.

In some example embodiments, RSRP measurements (e.g., instantaneous RSRP measurements) can be measured on the first network 404 prior to performance of the CSFB procedure, and RSCP measurements (e.g., instantaneous RSCP measurements) can be measured on the legacy network 406 during the voice call. A slope, which can, for example, be defined in terms of decibels per second (dB/sec), of a filtered mean of at least a portion of the RSRP samples can be calculated. Further, a slope, which can, for example, be defined in terms of dB/sec, of a filtered mean of at least a portion of the RSCP samples can be calculated. The slopes of the filtered means of the RSRP/RSCP samples can be used to make the determination of 630. In this regard, if the slopes are greater than a preset threshold slope, $m_{Threshold}$, then it can be determined that the wireless communication device 402 is in a mobility state. FIGS. 11 and 12 are illustrative of mobility determination in accordance with such example embodiments.

FIG. 11 illustrates a flowchart according to an example method for determining a mobility state of a wireless communication device prior to performance of a CSFB procedure based on a slope of a moving mean of RSRP measurements according to some example embodiments. Operation 1100 can include performing instantaneous RSRP measurements of a serving LTE cell. The instantaneous RSRP measurements can be passed through an IIR filter having window size $T_{Window}$, as illustrated by block 1110. The output of the filter block 1110 can be a filtered moving mean RSRP 1120. The filtered moving mean RSRP can be added to a circular buffer of size $N_{Buffer}$, as illustrated by block 1130. In this regard, a sample can be added every $T_{Window}$ seconds. The contents of the circular buffer can be passed to a slope calculation block 1140, which can output the slope $m_{RSRP}$ 1150, which can, for example, be expressed in dB/sec. The slope $m_{RSRP}$ can be compared to the predefined threshold slope, $m_{Threshold}$, at operation 1160. If $m_{RSRP}$ is determined to not be greater than $m_{Threshold}$, then it can be determined that the wireless communication device 404 is not in a mobility state (e.g., a static condition) prior to the CSFB procedure and the mobility flag can be set to 0, at operation 1170. If, however, $m_{RSRP}$ is determined to be greater than $m_{Threshold}$, then it can be determined that the wireless communication device 404 is in a mobility state (e.g., a mobility condition) prior to the CSFB procedure, and the mobility flag can be set to 1, at operation 1180.

FIG. 12 illustrates a flowchart according to an example method for determining a mobility state of a wireless communication device after performance of a CSFB procedure based on a slope of a moving mean of received signal code power measurements according to some example embodiments. Operation 1200 can include performing instantaneous common pilot channel (CPICH) RSCP measurements of a serving legacy network cell. The instantaneous RSCP measurements can be passed through an IIR filter having window size $T_{Window}$, as illustrated by block 1210. The output of the filter block 1210 can be a filtered moving mean RSCP 1220. The filtered moving mean RSCP 1220 can be added to a circular buffer of size $N_{Buffer}$, as illustrated by block 1230. In this regard, a sample can be added every $T_{Window}$ seconds. The contents of the circular buffer can be passed to a slope calculation block 1240, which can output the slope $m_{RSCP}$ 1250, which can, for example, be expressed in dB/sec. The slope $m_{RSCP}$ can be compared to the predefined threshold slope, $m_{Threshold}$, at operation 1260. If $m_{RSCP}$ is determined to not be greater than $m_{Threshold}$, then it can be determined that the wireless communication device 404 is not in a mobility state (e.g., a static condition) during the voice call and the mobility flag can be set to 0, at operation 1270. If, however, $m_{RSCP}$ is determined to be greater than $m_{Threshold}$, then it can be determined that the wireless communication device 404 is in a mobility state (e.g., a mobility condition) during the voice call and the mobility flag can be set to 1, at operation 1280.

Figure 13A:
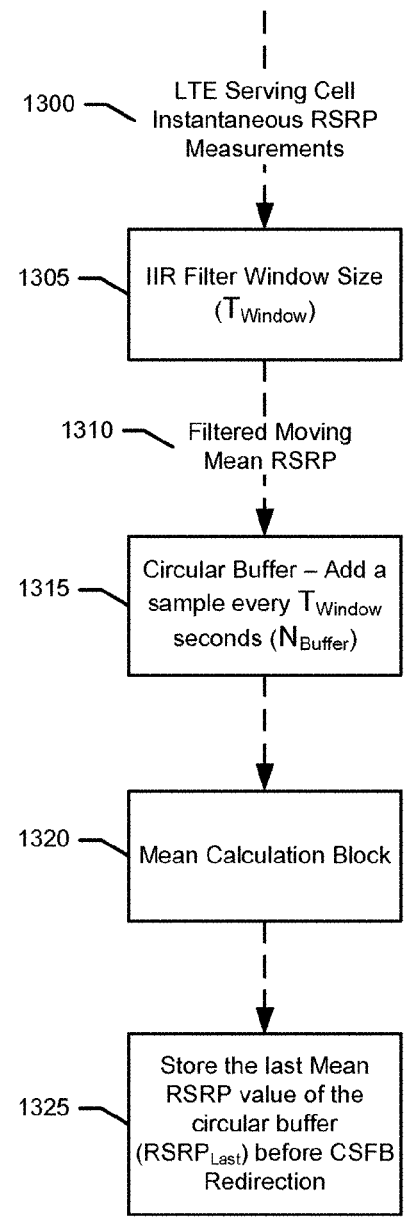
FIGS. 13A and 13B illustrate a cellular approach to determination of a predicted RSRP according to some example embodiments.
Figure 13B:
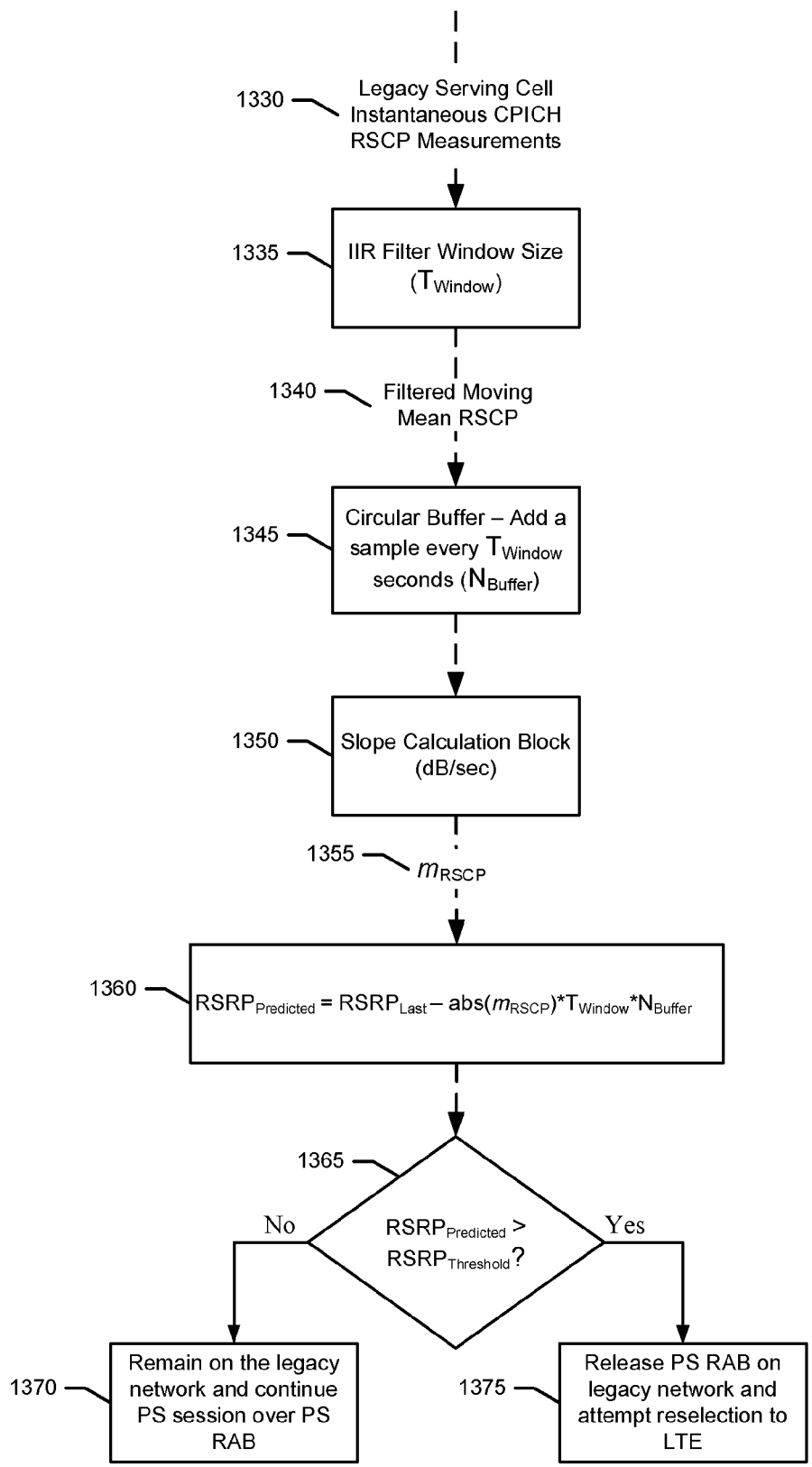

As discussed, a last mean RSRP value measured on the first network 404 prior to CSFB redirect can be used to determine a predicted RSRP of the first network 404 subsequent to voice call termination in some example embodiments. In some such embodiments, the predicted RSRP can be derived as a function of the last mean RSRP value and a slope (e.g., a slope in dB/sec) of a mean of at least a portion of RSCP samples measured on the legacy network 406 subsequent to performance of the CSFB procedure. FIGS. 13A and 13B illustrate an example of this cellular approach to determination of a predicted RSRP in accordance with some such example embodiments.

FIG. 13A illustrates operations that can be performed prior to CSFB redirection. Operation 1300 can include performing instantaneous RSRP measurements of a serving LTE cell. The instantaneous RSRP measurements can be passed through an IIR filter having window size $T_{Window}$, as illustrated by block 1305. The output of the filter block 1305 can be a filtered moving mean RSRP 1310. The filtered moving mean RSRP can be added to a circular buffer of size $N_{Buffer}$, as illustrated by block 1315. In this regard, a sample can be added every $T_{window}$ seconds. The buffer contents can be passed to a mean calculation block 1320. Operation 1325 can include storing a last mean RSRP value of the circular buffer, RSRP Last, Last, that is determined prior to the CSFB redirection for later use in calculating the predicted RSRP following termination of the voice call.

FIG. 13B illustrates operations that can be performed while the wireless communication device 402 is connected to the legacy network 406 subsequent to performance of the CSFB procedure in accordance with some example embodiments. Operation 1330 can include performing instantaneous CPICH RSCP measurements of a serving legacy network cell. The instantaneous RSCP measurements can be passed through an IIR filter having window size $T_{Window}$, as illustrated by block 1335. The output of the filter block 1335 can be a filtered moving mean RSCP 1340. The filtered moving mean RSCP 1340 can be added to a circular buffer of size $N_{Buffer}$, as illustrated by block 1345. In this regard, a sample can be added every $T_{Window}$ seconds. The contents of the circular buffer can be passed to a slope calculation block 1350, which can output the slope $M_{RSCP}$ 1355, which can, for example, be expressed in dB/sec. Operation 1360, which can correspond to operation 650 in some example embodiments, can include deriving the predicted RSRP, $RSRP_{Predicted}$ as a function of $RSRP_{Last}$ and $m_{RSCP}$. For example, $RSRP_{Predicted}$ can be derived using equation [6] set forth below and illustrated in FIG. 13B.

$$RSRP_{predicted} = RSRP_{Last} - abs(m_{RSCP}) * T_{Window} * N_{Buffer} \quad [6]$$

$RSRP_{Predicted}$ can be compared to the predefined threshold RSRP, $RSRP_{Threshold}$, at operation 1365, which can correspond to operation 660 in some example embodiments. If $RSRP_{Predicted}$ is determined to not be greater than $RSRP_{Threshold}$, then the wireless communication device 404 can remain on the legacy network and continue the PS data session over the existing PS RAB, as illustrated by operation 1370, which can correspond to operation 670 in some example embodiments. If, however, $RSRP_{Predicted}$ is determined to be greater than $RSRP_{Threshold}$, the wireless communication device 404 can release the PS RAB on the legacy network and attempt reselection to LTE, at operation 1375, which can correspond to operation 640 in some example embodiments.

Figure 14A:
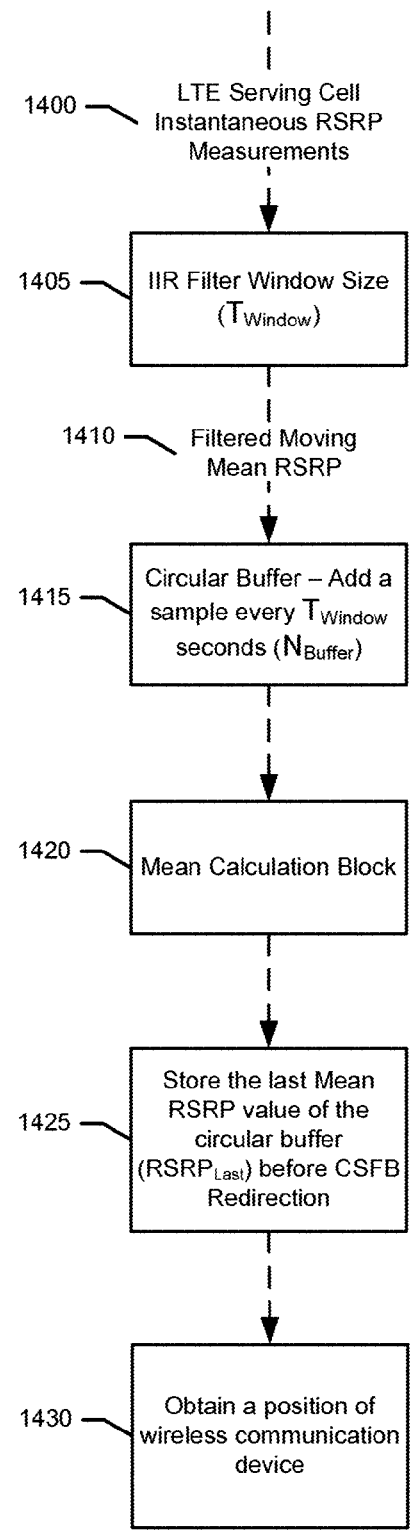
FIGS. 14A and 14B illustrate a position-based approach to determination of a predicted RSRP according to some example embodiments.
Figure 14B:
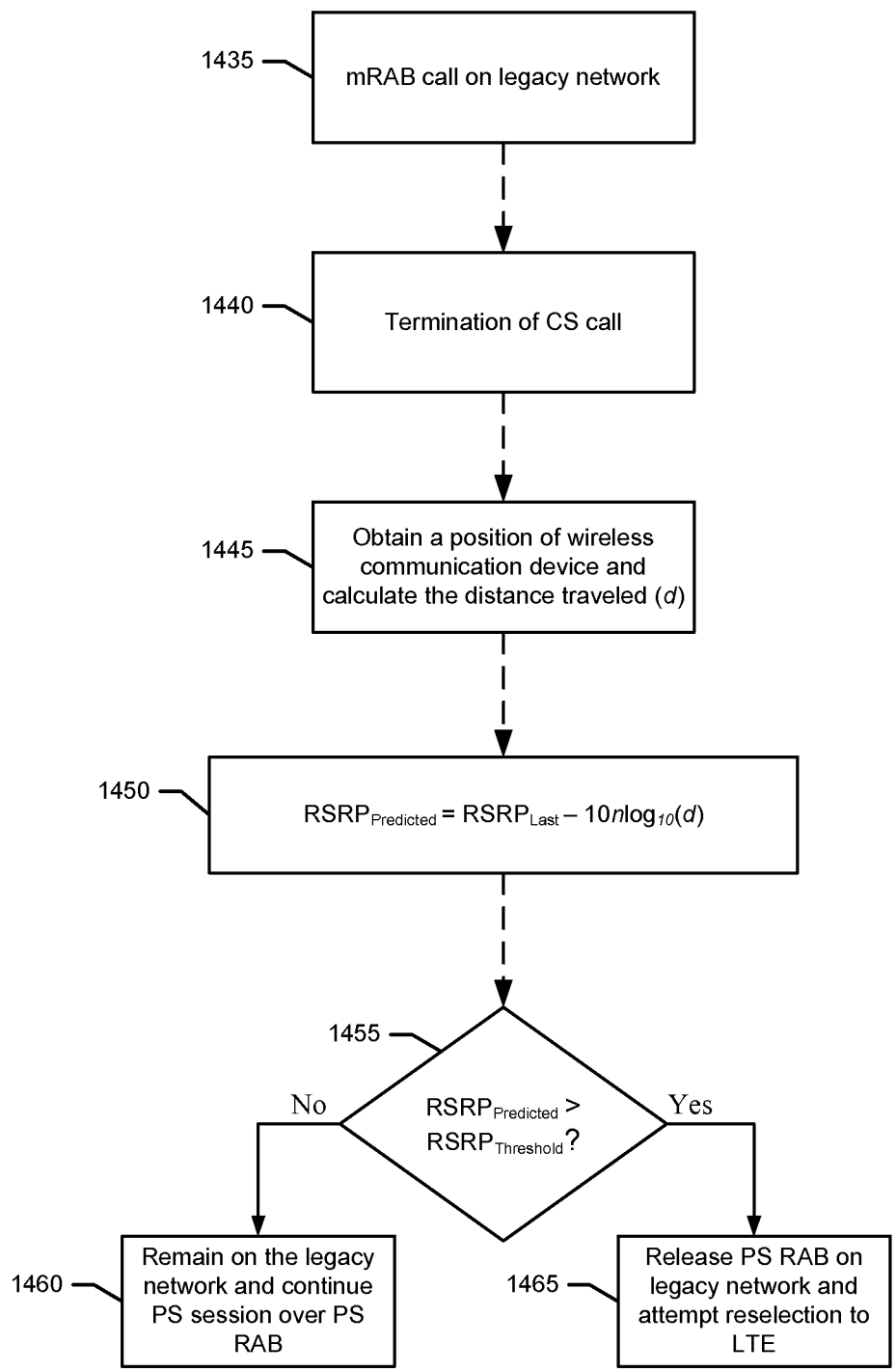

As another example, in some such embodiments, a predicted RSRP can be derived as a function of the last mean RSRP value, a distance traveled by the wireless communication device 404 during the voice call, and a propagation constant, n. FIGS. 14A and 14B illustrate an example of this position-based approach to determination of a predicted RSRP in accordance with some such example embodiments.

FIG. 14A illustrates operations that can be performed prior to CSFB redirection. Operation 1400 can include performing instantaneous RSRP measurements of a serving LTE cell. The instantaneous RSRP measurements can be passed through an IIR filter having window size $T_{Window}$, as illustrated by block 1405. The output of the filter block 1405 can be a filtered moving mean RSRP 1410. The filtered moving mean RSRP can be added to a circular buffer of size $N_{Buffer}$, as illustrated by block 1415. In this regard, a sample can be added every $T_{Window}$ seconds. The buffer contents can be passed to a mean calculation block 1420. Operation 1425 can include storing a last mean RSRP value of the circular buffer, $RSRP_{Last}$, that is determined prior to the CSFB redirection for later use in calculating the predicted RSRP following termination of the voice call. Operation 1430 can include obtaining a position of the wireless communication device 402, which can represent a position of the wireless communication device 402 at a time at which the CSFB call is initiated. The position can be derived through use of any location determining hardware, algorithms, and/or the like that can be implemented on the wireless communication device 402. For example, the location can be derived through a satellite positioning system, such as Global Positioning System (GPS), assisted GPS, a cell ID for the serving cell, an identifier on a wireless local area network (WLAN) sensed by the wireless communication device 402, and/or other techniques that can be used to determine a location. In some example embodiments, a GPS receiver can be implemented on the wireless communication device 402 and the GPS receiver can be temporarily activated to obtain a current position responsive to initiation of the voice call. The position obtained in operation 1430 can be stored or otherwise maintained for later use in determining a distance traveled during the voice call.

FIG. 14B illustrates operations that can be performed while the wireless communication device 402 is connected to the legacy network 406 subsequent to performance of the CSFB procedure in accordance with some example embodiments. As illustrated by block 1435, the wireless communication device 402 can have an mRAB call on the legacy network following performance of the CSFB procedure. At operation 1440, the CS call can terminate and the CS RAB can be released. In response to termination of the CS call, a position representative of the position of the wireless communication device 402 at termination of the CS call can be determined. The position can be derived through use of any location determining hardware, algorithms, and/or the like that can be implemented on the wireless communication device 402. For example, the location can be derived through a satellite positioning system, such as Global Positioning System (GPS), assisted GPS, a cell ID for the serving cell, an identifier on a wireless local area network (WLAN) sensed by the wireless communication device 402, and/or other techniques that can be used to determine a location. In some example embodiments, a GPS receiver can be implemented on the wireless communication device 402 and the GPS receiver can be temporarily activated to obtain a current position responsive to termination of the voice call. Operation 1445 can further include calculating a distance traveled (d) during the voice call based on the position obtained in operation 1430 and the position obtained in operation 1445.

Operation 1450, which can correspond to operation 650 in some example embodiments, can include deriving the predicted RSRP, $RSRP_{Predicted}$ as a function of $RSRP_{Last}$, the distance traveled d, and a propagation constant, n. For example, $RSRP_{Predicted}$ can be derived using equation [7] set forth below and illustrated in FIG. 14B.

$$RSRP_{Predicted} = RSRP_{Last} - 10n \log_{10}(d) \quad [7]$$

$RSRP_{Predicted}$ can be compared to the predefined threshold RSRP, $RSRP_{Threshold}$, at operation 1455, which can correspond to operation 660 in some example embodiments. If $RSRP_{Predicted}$ is determined to not be greater than $RSRP_{Threshold}$, then the wireless communication device 404 can remain on the legacy network and continue the PS data session over the existing PS RAB, as illustrated by operation 1460, which can correspond to operation 670 in some example embodiments. If, however, $RSRP_{Predicted}$ is determined to be greater than $RSRP_{Threshold}$, the wireless communication device 404 can release the PS RAB on the legacy network and attempt reselection to LTE, at operation 1465, which can correspond to operation 640 in some example embodiments.

Accordingly, if the decision procedures conclude a static condition or a mobility condition where the worst case predicted RSRP still meets the threshold RSRP (e.g., S-criteria), device forced reselection to the first network 404 can, for example, be triggered by sending an SCRI for PS domain on the legacy network 406 and reselecting to the first network 404. In this regard, even though inter-RAT measurements, such as B1/B2 measurements, may not be made for the first network 404 during the voice call, it can be safe to release the PS RAB on the legacy network 406 and reselect to the first network 404 since the static condition and/or worst case predicted RSRP is indicative that sufficient coverage is available.

In some example embodiments, if the serving legacy cell changes during the CSFB call, the circular buffer contents, such as filtered RSCP values, can be reset. In some example embodiments, measured user velocity, such as can be measured by GPS (if available), can be used to aid making mobility state determination and predicting RSRP. In such example embodiments, messaging can occur between cellular and GPS stacks to enable usage of measured user velocity.

Figure 15:
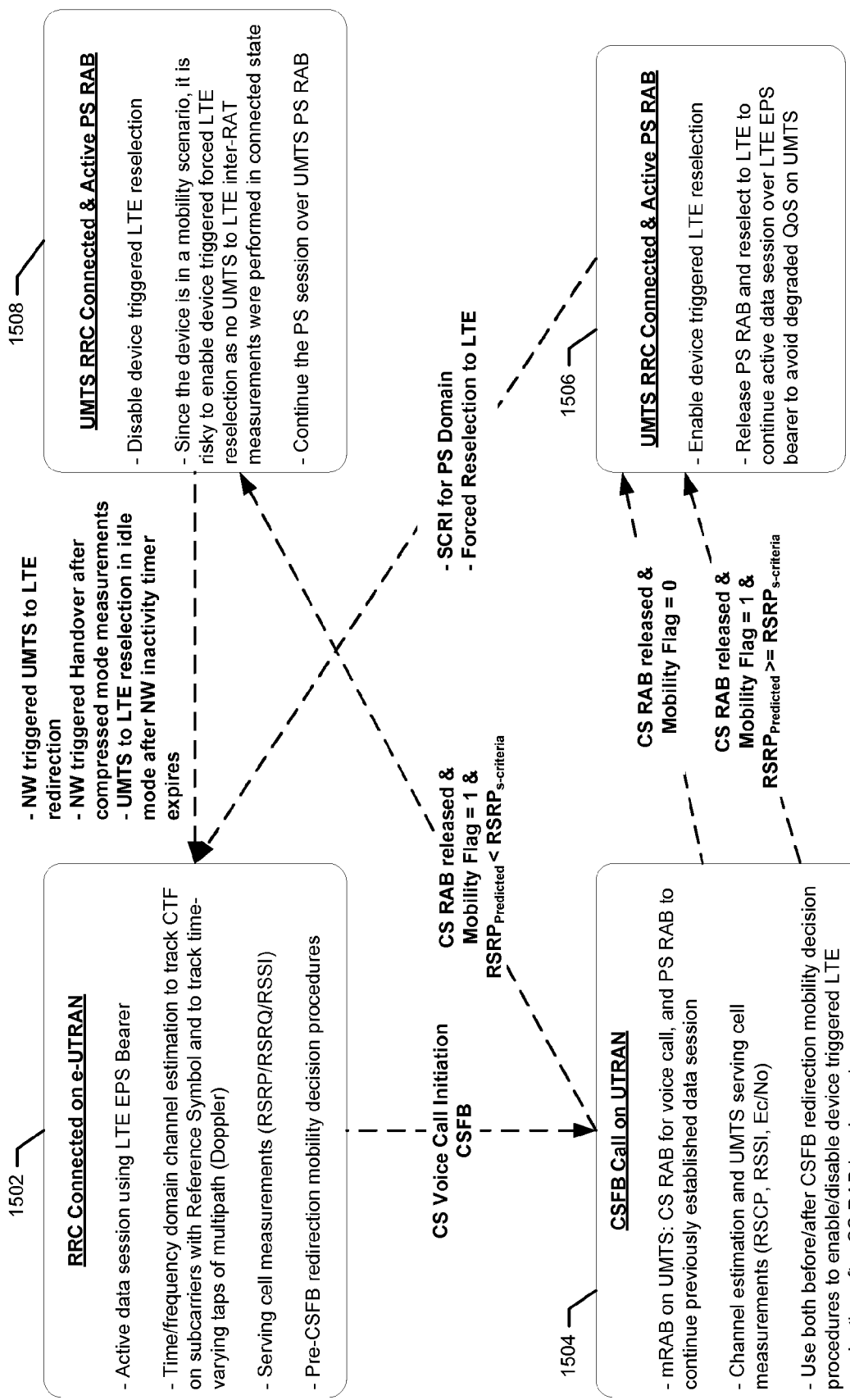
FIG. 15 illustrates a state diagram according to some example embodiments.

FIG. 15 illustrates a state diagram according to some example embodiments. In this regard, FIG. 10 illustrates an example embodiment in which the first network 404 can be an LTE network which the wireless communication device 402 can access via an e-UTRAN and the legacy network 406 can be a UMTS network which the wireless communication device 402 can access via a UTRAN. At state 1502, the wireless communication device 1002 can be connected to the e-UTRAN in RRC connected mode with an active data session using an LTE evolved packet service (EPS) bearer. The wireless communication device 402 can perform time and/or frequency domain channel estimation to track channel transfer function (CTF) on subcarriers with Reference Symbol and to track time-varying taps of multipath (e.g., Doppler shifts). The wireless communication device 402 can further perform serving cell measurements, such as RSRP measurements, RSRQ measurements, RSSI measurements, and/or the like. The wireless communication device 402 can additionally perform pre-CSFB redirection mobility decision procedures, such as one or more of those illustrated in FIGS. 7, 9, 11, 13A, and 14A in state 1502 in accordance with various example embodiments.

In response to initiation of a CS voice call, the wireless communication device 402 can transition to state 1504, in which the wireless communication device 402 can transition to UTRAN access through performance of a CSFB procedure. In state 1504, the wireless communication device 402 can have an mRAB call on the UMTS network, including a CS RAB for the voice call and a PS RAB to continue the previously established data session. The wireless communication device 402 can perform channel estimation on the UMTS serving cell, including performance of measurements such as RSCP, RSSI, Ec/No, and/or the like. Pre- and post-CSFB redirection mobility decision procedures, such as one or more of those illustrated in FIGS. 7-14 can be used to enable/disable device triggered LTE reselection after the CS RAB is released in response to termination of the voice call.

If it is determined that the wireless communication device 402 is not in a mobility state (e.g., Mobility Flag=0), the wireless communication device 402 can transition from state 1504 to state 1506. Further, even if it is determined that the wireless communication device 402 is in a mobility state (e.g., Mobility Flag=1), but the predicted RSRP satisfies the threshold RSRP, the wireless communication device 402 can transition from state 1504 to state 1506. At state 1506, the wireless communication device 402 can be connected to the UMTS network in RRC connected mode with an active PS RAB. However, device triggered LTE reselection can be enabled because mobility decision procedures can have determined that device triggered forced reselection is safe. Accordingly, the PS RAB can be released, such as by sending an SCRI for PS domain and the wireless communication device 402 can reselect to the LTE network to continue the active data session over an LTE EPS bearer to avoid degraded quality of service (QoS) on the UMTS network. Accordingly, the wireless communication device 402 can return to state 1502.

In the event of a call failure, such as a call drop, setup failure, or the like, the wireless communication device 402 can transition from state 1004 to state 1006. Further, in the event of an emergency call termination, which can include both normal and irregular emergency call disconnections in some embodiments, the wireless communication device 402 can transition from state 1004 to state 1006.

At state 1006, the wireless communication device 402 can be camped on the UTRAN/GERAN access with reselection to LTE being barred. The wireless communication device 402 can start a timer corresponding to the $t_{Barring}$ value selected in state 1004. In response to expiry of the timer, the wireless communication device 402 can transition to state 1008. In some example embodiments, if a packet switched service (e.g., a data session) is initiated following call failure, the wireless communication device 402 can transition to state 1008 even if the timer has not yet expired.

If it is determined at state 1504 that the wireless communication device 402 is in a mobility state (e.g., Mobility Flag=1 and that the predicted RSRP does not satisfy the threshold RSRP, the wireless communication device 402 can transition from state 1504 to state 1508. At state 1508, the wireless communication device 402 can be connected to the UMTS network in RRC connected mode with an active PS RAB. However, unlike with state 1508, device triggered LTE reselection can be disabled. In this regard, since the wireless communication device 402 has been determined to be in a mobility scenario, it can be risky to enable device triggered forced reselection as no UMTS to LTE inter-RAT measurements were performed in connected state and the device cannot be sure that LTE access is available. Accordingly, the PS data session can be continued over the UMTS PS RAB. The wireless communication device 402 can remain in state 1508 until one of a network triggered UTMS to LTE reselection, a network triggered handover to LTE after compressed mode measurements, or until a UMTS to LTE reselection in idle mode after a network inactivity timer expires, at which point the wireless communication device 402 can return to the LTE network, and potentially to state 1502.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for facilitating reselection by a wireless communication device to a Long Term Evolution (LTE) network from a legacy network after termination of a voice call for which a Circuit Switched Fallback (CSFB) procedure is performed, the method comprising:
   by the wireless communication device:
   performing measurement of the LTE network while the wireless communication device is connected to the LTE network;
   participating in a circuit switched fallback (CSFB) procedure to transition from the LTE network to the legacy network in response to initiation of the voice call;

performing measurement of the legacy network during the voice call;

determining based at least in part on one or more of the measurement of the LTE network and the measurement of the legacy network whether the wireless communication device is in a mobility state such that the wireless communication device is not static;

deriving a predicted reference signal received power (RSRP) of the LTE network after termination of the voice call based at least in part on the measurement of the LTE network performed while the wireless communication device was connected to the LTE network;

releasing a packet switched radio access bearer on the legacy network and attempting reselection to the LTE network in an instance in which the predicted RSRP satisfies a threshold RSRP; and remaining on the legacy network and continuing a packet switched session over the packet switched radio access bearer in an instance in which the predicted RSRP does not satisfy the threshold RSRP.

2. The method of claim 1, wherein the predicted RSRP of the LTE network is derived without performance of an inter-radio access technology measurement of the LTE network while the wireless communication device is connected to the legacy network.

3. The method of claim 1, wherein in an instance in which it is determined based at least in part on one or more of the measurement of the LTE network and the measurement of the legacy network that the wireless communication device is not in a mobility state, the method further comprises releasing the packet switched radio access bearer on the legacy network and attempting reselection to the LTE network.

4. The method of claim 1, wherein an access point for the LTE network and an access point for the legacy network are co-located.

5. The method of claim 1, wherein:
performing measurement of the LTE network while the wireless communication device is connected to the LTE network comprises measuring RSRP samples for a serving LTE cell while the wireless communication device is connected to the LTE network;
performing measurement of the legacy network comprises measuring received signal code power (RSCP) samples for a serving legacy network cell; and
determining whether the wireless communication device is in a mobility state comprises:
calculating a variance of a moving mean of at least a portion of the RSRP samples;
calculating a variance of a moving mean of at least a portion of the RSCP samples;
comparing the variance of the moving mean of the RSRP samples and the variance of the moving mean of the RSCP samples to a predefined variance threshold; and
determining that the wireless communication device is in a mobility state in an instance in which the variance of the moving mean of the RSRP samples and the variance of the moving mean of the RSCP samples exceed the predefined variance threshold.

6. The method of claim 1, wherein:
performing measurement of the LTE network while the wireless communication device is connected to the LTE network comprises measuring Doppler shifts for a serving LTE cell while the wireless communication device is connected to the LTE network;
performing measurement of the legacy network comprises measuring Doppler shifts for a serving legacy network cell; and determining whether the wireless communication device is in a mobility state comprises:
calculating a first mean Doppler shift of the measured Doppler shifts for the serving LTE cell;
calculating a second mean Doppler shift of the measured Doppler shifts for the serving legacy network cell;
comparing the first mean Doppler shift and the second mean Doppler shift to a threshold Doppler shift; and
determining that the wireless communication device is in a mobility state in an instance in which the first mean Doppler shift and the second mean Doppler shift exceed the threshold Doppler shift.

7. The method of claim 1, wherein:
performing measurement of the LTE network while the wireless communication device is connected to the LTE network comprises measuring RSRP samples for a serving LTE cell while the wireless communication device is connected to the LTE network;
performing measurement of the legacy network comprises measuring received signal code power (RSCP) samples for a serving legacy network cell; and
determining whether the wireless communication device is in a mobility state comprises:
calculating a first slope of a filtered mean of at least a portion of the RSRP samples;
calculating a second slope of a filtered mean of at least a portion of the RSCP samples;
comparing the first slope and the second slope to a threshold slope; and
determining that the wireless communication device is in a mobility state in an instance in which the first slope and the second slope exceed the threshold slope.

8. The method of claim 1, wherein:
performing measurement of the LTE network while the wireless communication device is connected to the LTE network comprises measuring RSRP samples for a serving LTE cell while the wireless communication device is connected to the LTE network;
performing measurement of the legacy network comprises measuring received signal code power (RSCP) samples for a serving legacy network cell; and
deriving the predicted RSRP of the LTE network comprises deriving the predicted RSRP as a function of a last mean RSRP value measured prior to performance of the CSFB procedure and a slope of a mean of at least a portion of the RSCP samples.

9. The method of claim 1, further comprising:
determining a first position of the wireless communication device in response to initiation of the voice call; and
determining a second position of the wireless communication device in response to termination of the voice call;
wherein performing measurement of the LTE network while the wireless communication device is connected to the LTE network comprises measuring RSRP samples for a serving LTE cell while the wireless communication device is connected to the LTE network; and
wherein deriving the predicted RSRP of the LTE network comprises:
calculating a distance between the first position and the second position; and
deriving the predicted RSRP as a function of a last mean RSRP value measured prior to performance of the CSFB procedure, the calculated distance between the first position and the second position, and a propagation constant.

10. The method of claim 1, wherein the legacy network is either a Universal Mobile Telecommunications System (UMTS) network or a Global System for Mobile Communications (GSM) network.

11. A wireless communication device comprising:
at least one transceiver, the at least one transceiver configured to transmit data to and receive data from a first network and a second network; and
processing circuitry coupled to the at least one transceiver, the processing circuitry configured to control the wireless communication device to at least:
perform measurement of the first network while the wireless communication device is connected to the first network;
participate in a circuit switched fallback (CSFB) procedure to transition from the first network to the second network in response to initiation of a voice call;
perform measurement of the second network during the voice call;
determine based at least in part on one or more of the measurement of the first network and the measurement of the second network whether the wireless communication device is in a mobility state such that the wireless communication device is not static;
derive a predicted signal quality of the first network after termination of the voice call based at least in part on the measurement of the first network performed while the wireless communication device was connected to the first network; and
release a packet switched radio access bearer on the second network and attempt reselection to the first network in an instance in which the predicted signal quality satisfies a threshold signal quality; and
remain on the second network and continue a packet switched session over the packet switched radio access bearer in an instance in which the predicted signal quality does not satisfy the threshold signal quality.

12. The wireless communication device of claim 11, wherein in an instance in which the wireless communication device is not in a mobility state, the processing circuitry is configured to control the wireless communication device to release the packet switched radio access bearer on the second network and attempt reselection to the first network.

13. The wireless communication device of claim 11, wherein the first network comprises a Long Term Evolution (LTE) network, and wherein the processing circuitry is configured to control the wireless communication device to:
perform measurement of the LTE network while the wireless communication device is connected to the LTE network at least in part by measuring reference signal received power (RSRP) samples for a serving LTE cell while the wireless communication device is connected to the LTE network;
perform measurement of the second network at least in part by measuring received signal code power (RSCP) samples for a serving cell on the second network; and
determine whether the wireless communication device is in a mobility state at least in part by:
calculating a variance of a moving mean of at least a portion of the RSRP samples;
calculating a variance of a moving mean of at least a portion of the RSCP samples;
comparing the variance of the moving mean of the RSRP samples and the variance of the moving mean of the RSCP samples to a predefined variance threshold; and
determining that the wireless communication device is in a mobility state in an instance in which the variance of the moving mean of the RSRP samples and the variance of the moving mean of the RSCP samples exceed the predefined variance threshold.

14. The wireless communication device of claim 11, wherein the processing circuitry is configured to control the wireless communication device to:
perform measurement of the first network while the wireless communication device is connected to the first network at least in part by measuring Doppler shifts for a serving cell on the first network while the wireless communication device is connected to the first network;
perform measurement of the second network at least in part by measuring Doppler shifts for a serving cell on the second network; and
determine whether the wireless communication device is in a mobility state at least in part by:
calculating a first mean Doppler shift of the measured Doppler shifts for the serving cell on the first network;
calculating a second mean Doppler shift of the measured Doppler shifts for the serving cell on the second network;
comparing the first mean Doppler shift and the second mean Doppler shift to a threshold Doppler shift; and
determining that the wireless communication device is in a mobility state in an instance in which the first mean Doppler shift and the second mean Doppler shift exceed the threshold Doppler shift.

15. The wireless communication device of claim 11, wherein the first network comprises a Long Term Evolution (LTE) network, and wherein the processing circuitry is configured to control the wireless communication device to:
perform measurement of the LTE network while the wireless communication device is connected to the LTE network at least in part by measuring reference signal received power (RSRP) samples for a serving LTE cell while the wireless communication device is connected to the LTE network;
perform measurement of the second network at least in part by measuring received signal code power (RSCP) samples for a serving cell on the second network; and
determine whether the wireless communication device is in a mobility state at least in part by:
calculating a first slope of a filtered mean of at least a portion of the RSRP samples;
calculating a second slope of a filtered mean of at least a portion of the RSCP samples;
comparing the first slope and the second slope to a threshold slope; and
determining that the wireless communication device is in a mobility state in an instance in which the first slope and the second slope exceed the threshold slope.

16. The wireless communication device of claim 11, wherein the processing circuitry is configured to control the wireless communication device to derive the predicted signal quality of the first network at least in part by deriving a predicted reference signal received power (RSRP) of the first network, and wherein the threshold signal quality comprises a threshold RSRP.

17. The wireless communication device of claim 16, wherein the first network comprises a Long Term Evolution (LTE) network, and wherein the processing circuitry is configured to control the wireless communication device to:
perform measurement of the LTE network while the wireless communication device is connected to the LTE network at least in part by measuring RSRP samples for a serving LTE cell while the wireless communication device is connected to the LTE network;

perform measurement of the second network at least in part by measuring received signal code power (RSCP) samples for a serving cell on the second network; and derive the predicted RSRP as a function of a last mean RSRP value measured prior to performance of the CSFB procedure and a slope of a mean of at least a portion of the RSCP samples.

18. The wireless communication device of claim 16, wherein the first network comprises a Long Term Evolution (LTE) network, and wherein the processing circuitry is configured to further control the wireless communication device to:

determine a first position of the wireless communication device in response to initiation of the voice call;

determine a second position of the wireless communication device in response to termination of the voice call;

perform measurement of the LTE network while the wireless communication device is connected to the LTE network at least in part by measuring RSRP samples for a serving LTE cell while the wireless communication device is connected to the LTE network; and derive the predicted RSRP of the LTE network at least in part by:

calculating a distance between the first position and the second position; and deriving the predicted RSRP as a function of a last mean RSRP value measured prior to performance of the CSFB procedure, the calculated distance between the first position and the second position, and a propagation constant.

19. A computer program product for facilitating reselection by a wireless communication device to a first network from a second network after termination of a voice call for which a Circuit Switched Fallback (CSFB) procedure was performed, the computer program product comprising at least one non-transitory computer readable storage medium having computer program code stored thereon, the computer program code comprising:

program code for performing measurement of the first network while the wireless communication device is connected to the first network;

program code for participating in a CSFB procedure to transition from the first network to the second network in response to initiation of the voice call;

program code for performing measurement of the second network during the voice call;

program code for determining based at least in part on one or more of the measurement of the first network and the measurement of the second network whether the wireless communication device is in a mobility state such that the wireless communication device is not static;

program code for deriving a predicted signal quality of the first network after termination of the voice call based at least in part on the measurement of the first network performed while the wireless communication device was connected to the first network;

program code for releasing a packet switched radio access bearer on the second network and attempting reselection to the first network in an instance in which the predicted signal quality satisfies a threshold signal quality; and program code for remaining on the second network and continuing a packet switched session over the packet switched radio access bearer in an instance in which the predicted signal quality does not satisfy the threshold signal quality.

20. The computer program product of claim 19, wherein the first network comprises a Long Term Evolution (LTE) network, and wherein:

the program code for performing measurement of the first network comprises program code for measuring reference signal received power (RSRP) samples for a serving LTE cell while the wireless communication device is connected to the LTE network;

the program code for performing measurement of the second network comprises program code for measuring received signal code power (RSCP) samples for a serving cell on the second network; and the program code for determining whether the wireless communication device is in a mobility state comprises:

program code for calculating a variance of a moving mean of at least a portion of the RSRP samples;

program code for calculating a variance of a moving mean of at least a portion of the RSCP samples;

program code for comparing the variance of the moving mean of the RSRP samples and the variance of the moving mean of the RSCP samples to a predefined variance threshold; and program code for determining that the wireless communication device is in a mobility state in an instance in which the variance of the moving mean of the RSRP samples and the variance of the moving mean of the RSCP samples exceed the predefined variance threshold.

21. The computer program product of claim 19, wherein:

the program code for performing measurement of the first network comprises program code for measuring Doppler shifts for a serving cell on the first network while the wireless communication device is connected to the first network;

the program code for performing measurement of the second network comprises program code for measuring Doppler shifts for a serving cell on the second network; and the program code for determining whether the wireless communication device is in a mobility state comprises:

program code for calculating a first mean Doppler shift of the measured Doppler shifts for the serving cell on the first network;

program code for calculating a second mean Doppler shift of the measured Doppler shifts for the serving cell on the second network;

program code for comparing the first mean Doppler shift and the second mean Doppler shift to a threshold Doppler shift; and program code for determining that the wireless communication device is in a mobility state in an instance in which the first mean Doppler shift and the second mean Doppler shift exceed the threshold Doppler shift.

22. The computer program product of claim 19, wherein the first network comprises a Long Term Evolution (LTE) network, and wherein:

the program code for performing measurement of the first network comprises program code for measuring reference signal received power (RSRP) samples for a serving LTE cell while the wireless communication device is connected to the LTE network;

the program code for performing measurement of the second network comprises program code for measuring received signal code power (RSCP) samples for a serving cell on the second network; and the program code for determining whether the wireless communication device is in a mobility state comprises:
  program code for calculating a first slope of a filtered mean of at least a portion of the RSRP samples;
  program code for calculating a second slope of a filtered mean of at least a portion of the RSCP samples;
  program code for comparing the first slope and the second slope to a threshold slope; and
  program code for determining that the wireless communication device is in a mobility state in an instance in which the first slope and the second slope exceed the threshold slope.

23. The computer program product of claim 19, wherein the program code for deriving the predicted signal quality of the first network comprises program code for deriving a predicted reference signal received power (RSRP) of the first network, and wherein the threshold signal quality comprises a threshold RSRP.

24. The computer program product of claim 23, wherein the first network comprises a Long Term Evolution (LTE) network, and wherein:
  the program code for performing measurement of first network comprises program code for measuring RSRP samples for a serving LTE cell while the wireless communication device is connected to the LTE network;
  the program code for performing measurement of the second network comprises program code for measuring received signal code power (RSCP) samples for a serving cell on the second network; and
  the program code for deriving the predicted RSRP comprises program code for deriving the predicted RSRP as a function of a last mean RSRP value measured prior to performance of the CSFB procedure and a slope of a mean of at least a portion of the RSCP samples.

25. The computer program product of claim 23, wherein the first network comprises a Long Term Evolution (LTE) network, the computer program code further comprising:
  program code for determining a first position of the wireless communication device in response to initiation of the voice call; and
  program code for determining a second position of the wireless communication device in response to termination of the voice call;
  wherein the program code for performing measurement of the first network comprises program code for measuring RSRP samples for a serving LTE cell while the wireless communication device is connected to the LTE network; and
  wherein the program code for deriving the predicted RSRP comprises:
    program code for calculating a distance between the first position and the second position; and
    program code for deriving the predicted RSRP as a function of a last mean RSRP value measured prior to performance of the CSFB procedure, the calculated distance between the first position and the second position, and a propagation constant.

* * * * *